(12) United States Patent
Modarres Razavi et al.

(10) Patent No.: US 10,834,695 B2
(45) Date of Patent: Nov. 10, 2020

(54) OTDOA NETWORK ASSISTANCE TO MTC/NB-IOT USER EQUIPMENT

(71) Applicant: Telefonaktiebolaget LM Ericsson (publ), Stockholm (SE)

(72) Inventors: Sara Modarres Razavi, Linköping (SE); Johan Bergman, Stockholm (SE); Fredrik Gunnarsson, Linköping (SE); Olof Liberg, Stockholm (SE); Xingqin Lin, Santa Clara, CA (US); Henrik Rydén, Solna (SE); Iana Siomina, Täby (SE); Yutao Sui, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/340,308

(22) PCT Filed: Sep. 29, 2017

(86) PCT No.: PCT/SE2017/050963
§ 371 (c)(1),
(2) Date: Apr. 8, 2019

(87) PCT Pub. No.: WO2018/070913
PCT Pub. Date: Apr. 19, 2018

(65) Prior Publication Data
US 2020/0045667 A1   Feb. 6, 2020

Related U.S. Application Data

(60) Provisional application No. 62/406,183, filed on Oct. 10, 2016.

(51) Int. Cl.
*H04W 24/10* (2009.01)
*H04W 76/28* (2018.01)
(Continued)

(52) U.S. Cl.
CPC ......... *H04W 64/003* (2013.01); *G01S 5/0036* (2013.01); *G01S 5/0236* (2013.01);
(Continued)

(58) Field of Classification Search
CPC . H04W 24/10; H04W 52/0209; H04W 24/02; H04W 64/00; H04W 4/23;
(Continued)

(56) References Cited

U.S. PATENT DOCUMENTS 9,432,809 B2 * 8/2016 Fischer ................. H04W 4/023
9,591,450 B2 * 3/2017 Fischer ................. H04L 5/0048
(Continued)

OTHER PUBLICATIONS

3GPP TS 36.306 v13.2.0; Technical Specification; 3rd Generation Partnership Project; Technical Specification Group Radio Access Network; Evolved Universal Terrestrial Radio Access (E-UTRA); User Equipment (UE) radio access capabilities (Release 13)—Jun. 2016.

(Continued)

*Primary Examiner* — William D Cumming
(74) *Attorney, Agent, or Firm* — Baker Botts, LLP

(57) ABSTRACT

According to certain embodiments, a method is disclosed for use in a wireless device that is configured as a Narrowband Internet-of-Things (NB-IoT) device or a machine-type-communication (MTC) device. The method comprises determining at least one parameter related to positioning. The at least one parameter is based on a capability of the wireless device that relates to observed time difference of arrival (OTDOA) positioning with NB-IoT or MTC. The method further comprises using the determined at least one parameter related to positioning.

18 Claims, 13 Drawing Sheets

(51) Int. Cl.
    H04W 4/23      (2018.01)
    H04W 64/00     (2009.01)
    H04W 76/45     (2018.01)
    G01S 5/00      (2006.01)
    G01S 5/02      (2010.01)
    G01S 5/10      (2006.01)
    H04L 5/00      (2006.01)
(52) U.S. Cl.
    CPC ............. *G01S 5/10* (2013.01); *H04L 5/0048* (2013.01); *H04L 5/0053* (2013.01)
(58) Field of Classification Search
    CPC ..... H04W 76/45; H04W 72/04; H04W 76/28; H04W 52/0216; H04W 64/003; H04W 88/18; H04W 4/02; H04W 72/0453
    USPC ...................... 370/329, 252; 455/456, 456.2
    See application file for complete search history.

(56) References Cited

U.S. PATENT DOCUMENTS

| | | | | |
|---|---|---|---|---|
| 9,774,429 | B2* | 9/2017 | Patel | H04W 72/0453 |
| 9,801,022 | B2* | 10/2017 | Fischer | H04L 5/0048 |
| 10,327,109 | B1* | 6/2019 | Maheshwari | G06Q 10/047 |
| 10,367,618 | B2* | 7/2019 | Patel | H04L 27/0006 |
| 10,432,254 | B2* | 10/2019 | Takeda | H04B 1/713 |
| 10,433,275 | B2* | 10/2019 | Edge | G01S 5/00 |
| 10,512,057 | B1* | 12/2019 | Maheshwari | H04W 24/10 |
| 2014/0064133 | A1* | 3/2014 | Kazmi | H04W 24/10 370/252 |
| 2015/0018010 | A1* | 1/2015 | Fischer | H04W 76/28 455/456.2 |
| 2015/0263837 | A1* | 9/2015 | Patel | H04L 5/0048 370/329 |
| 2016/0337798 | A1* | 11/2016 | Fischer | H04L 5/0048 |
| 2017/0134904 | A1* | 5/2017 | Fischer | H04W 64/00 |
| 2017/0353278 | A1* | 12/2017 | Patel | H04W 72/0453 |
| 2018/0146332 | A1* | 5/2018 | Opshaug | G01S 5/0036 |
| 2018/0183491 | A1* | 6/2018 | Takeda | H04B 7/12 |
| 2018/0217228 | A1* | 8/2018 | Edge | H04W 4/02 |
| 2018/0249440 | A1* | 8/2018 | Zhang | H04W 76/45 |
| 2018/0270671 | A1* | 9/2018 | Agnihotri | H04W 24/02 |
| 2018/0343635 | A1* | 11/2018 | Edge | H04W 4/02 |
| 2019/0007923 | A1* | 1/2019 | Blankenship | H04L 5/0073 |
| 2019/0037529 | A1* | 1/2019 | Edge | H04B 7/0417 |
| 2019/0052996 | A1* | 2/2019 | Sahai | H04W 24/10 |
| 2019/0327673 | A1* | 10/2019 | Bitra | G01S 5/0236 |
| 2019/0327706 | A1* | 10/2019 | Agnihotri | H04W 64/003 |
| 2019/0327707 | A1* | 10/2019 | Agnihotri | G01S 5/0236 |

OTHER PUBLICATIONS

3GPP TS 36.355 v13.2.0; Technical Specification; 3rd Generation Partnership Project; Technical Specification Group Radio Access Network; Evolved Universal Terrestrial Radio Access (E-UTRA); LTE Positioning Protocol (LPP) (Release 13)—Sep. 2019.
3GPP TSG RAN WG1 Meeting #86; Gothenburg, Sweden; Source: ITL: Title: Support of OTDOA in NB-IoT (R1-167752)—Aug. 22-26, 2016.
3GPP TSG RAN Meeting #72; Busan, Korea; Source: Vodafone, Huawei, HiSilicon, Ericsson, Qualcomm; Title: New work item proposal; Enhancements of NB-IoT (RP-161324)—Jun. 13-16, 2016.
3GPP TSG RAN Meeting #73; New Orleans, USA; Source: Ericsson; Title: Revised WID for Further Enhanced MTC for LTE (RP-161464)—Sep. 19-22, 2016.
SA WG2 Meeting #116bis; Sanya, P.R. China; Source: Qualcomm Incorporated; Title: Location Support for CIoT Devices (S2-164488)—Aug. 29-Sep. 2, 2016.
PCT International Search Report for International application No. PCT/SE2017/050963—dated Jan. 3, 2018.
PCT Written Opinion of the International Searching Authority for International application No. PCT/SE2017/050963—dated Jan. 3, 2018.
ETSI TS 133 401 v13.4.0; Technical Specification; Digital cellular telecommunications system (Phase 2+) (GSM); Universal Mobile Telecommunications System (UMTS); LTE; 3GPP System Architecture Evolution (SAE); Security architecture (3GPP TS 33.401 version 13.4.0 Release 13)—Oct. 2016.
Observed Time Difference of Arrival (OTDOA) Positioning in 3GPP LTE by Sven Fischer; Qualcomm Technologies, Inc.—Jun. 6, 2014.
3GPP TSG-RAN2 Meeting #96 (R2-168328); Reno, Nevada, United States; Source: Ericsson; Title: Positioning for FeMTC; Nov. 14-18, 2016, 3 pages.
3GPP TSG-RAN1 Meeting #87 (R1-1612795); Reno, Nevada, United States; Source: Ericsson; Title: On OTDOA framework for NB-IoT; Nov. 14-18, 2016, 3 pages.
3GPP TSG-RAN1 Meeting #87 (R-1611103); Reno, Nevada, United States; Source: Ericsson; Title: PRS configurations for FeMTC; Nov. 14-18, 2016, 5 pages.
3GPP TSG RAN WG1 Meeting #86bis (R1-1610221); Lisbon, Portugal; Source: ITL; Title: Support of OTDOA in NB-IoT; Oct. 10-14, 2016, 9 pages.
3GPP TSG RAN WG1 Meeting #86bis (R1-1609377); Lisbon, Portugal; Source: Nokia, Alcatel-Lucent Shanghai Bell; Title: RSTD Measurement and Reporting in NB-IoT; Oct. 10-14, 2016, 2 pages.
3GPP TSG-RAN WG2 #91bis (Tdoc R2-154712); Malmö, Sweden; Source: Ericsson; Title: LPP signaling support for OTDOA/ECID enhancement; Oct. 5-9, 2015; 6 pages.
European Patent Office Communication Pursuant to Rule 62 EPC, Supplementary European Search Report, European Search Opinion, and Information on Search Strategy for International Application No. / Patent No. 17860859.2-1212 / 3524024 , PCT/SE2017050963; dated Mar. 23, 2020, 13 pages.

* cited by examiner

OTDOA NETWORK ASSISTANCE TO MTC/NB-IOT USER EQUIPMENT

PRIORITY

This nonprovisional application is a U.S. National Stage Filing under 35 U.S.C. § 371 of International Patent Application Serial No. PCT/SE2017/050963 filed Sep. 29, 2017 and entitled "OTDOA NETWORK ASSISTANCE TO MTC/NB-IOT USER EQUIPMENT" which claims priority to U.S. Provisional Patent Application No. 62/406,183 filed Oct. 10, 2016 both of which are hereby incorporated by reference in their entirety.

TECHNICAL FIELD

The present disclosure relates, in general, to wireless communications and, more particularly, to observed time difference of arrival (OTDOA) network assistance to machine-type communication (MTC) and/or narrowband Internet-of-Things (NB-IoT) user equipment.

BACKGROUND

The Internet of Things (IoT) is a vision for the future world where everything that can benefit from a connection will be connected. Cellular technologies are being developed or evolved to play an indispensable role in the IoT world. One particular example is MTC. MTC is characterized by lower demands on data rates than, for example, mobile broadband, but with higher requirements on, for example, low cost device design, better coverage, and the ability to operate for years on batteries without charging or replacing the batteries. To meet the IoT design objectives, the 3rd Generation Partnership Project (3GPP) has standardized Narrowband IoT (NB-IoT) in Release 13, which has a system bandwidth of 180 kHz and targets improved coverage, long battery life, low complexity communication design, and network capacity that is sufficient for supporting a massive number of devices.

To further increase the market impact of further enhanced MTC and NB-IoT, improving narrowband support for positioning has been agreed to be a key aspect of both of these devices in Release 14, as described in 3GPP RP-161324, "New work item proposal: Enhancements of NB-IoT," Vodafone, Huawei, HiSilicon, Ericsson, Qualcomm, 3GPP TSG RAN Meeting #72, Busan, Korea, Jun. 13-16, 2016. The enhancement will be designed to maintain the ultra-low cost and complexity of these user equipment (UE) where appropriate, as well as the coverage and capacity of the network.

Beside NB-IoT, LTE Release 13 also introduced UE category M1 (described in 3GPP TS 36.306, "3rd Generation Partnership Project; Technical Specification Group Radio Access Network; Evolved Universal Terrestrial Radio Access (E-UTRA); User Equipment (UE) radio access capabilities (Release 13)", V13.2.0 (2016-06)), which addresses somewhat more demanding MTC applications. UE category M1 is associated with a maximum channel bandwidth of 6 physical resource blocks (PRBs) (corresponding to 1.08 MHz excluding guard bands or 1.4 MHz including guard bands), which can be compared to 1 PRB for NB-IoT UEs or 100 PRBs for higher LTE UE categories. Furthermore, 3GPP has initiated a LTE Release 14 work item on "Further enhanced MTC" (FeMTC) where a UE type based on UE category M1 with a maximum channel bandwidth of approximately 25 PRBs (corresponding to 4.5 MHz excluding guard bands and 5 MHz including guard bands) will be specified in order to address even more demanding applications. This is described in 3GPP RP-161464, "Revised WID for Further Enhanced MTC for LTE," Ericsson, 3GPP TSG RAN Meeting #73, New Orleans, USA, Sep. 19-22, 2016. In this FeMTC work item, OTDOA improvements with respect to positioning accuracy, UE complexity and power consumption for these (6-PRB and 25-PRB) UEs are also being considered for standardization.

Location-based services and emergency call positioning drive the development of positioning in wireless networks. Positioning support in 3GPP Long Term Evolution (LTE) was introduced in Release 9. This enables operators to retrieve position information for location-based services and to meet regulatory emergency call positioning requirements.

FIG. 1 illustrates the LTE positioning architecture. Positioning in LTE is supported by the architecture in FIG. 1. Direct interactions between a UE and a location server (such as an Evolved Serving Mobile Location Centre, E-SMLC) is via the LTE Positioning Protocol (LPP). Moreover, there are also interactions between the location server and the eNodeB via the LTE Positioning Protocol Annex (LPPa) protocol, to some extent supported by interactions between eNodeB and the UE via the Radio Resource Control (RRC) protocol.

The following positioning techniques are considered in LTE:
  Enhanced Cell ID: Essentially, cell ID information to associate the UE to the serving area of a serving cell, and then additional information to determine a finer granularity position;
  Assisted Global Navigation Satellite System (GNSS): GNSS information retrieved by the UE, supported by assistance information provided to the UE from the E-SMLC;
  OTDOA: The UE estimates the time difference of reference signals from different base stations and sends to the E-SMLC for multi-lateration;
  Uplink Time Difference of Arrival (UTDOA): The UE is requested to transmit a specific waveform that is detected by multiple location measurement units (e.g., an eNB) at known positions. These measurements are forwarded to E-SMLC for multilateration.

FIG. 2 illustrates OTDOA position estimation based on multi-lateration of the RSTD measurements. OTDOA has been introduced in 3GPP Release 9 as a downlink (DL) positioning method. As illustrated in FIG. 2, OTDOA in LTE is based on the device measuring the time of arrival (TOA) of signals received from eNBs. The device measures the relative difference between the reference cell and another specific cell, defined as reference signal time difference (RSTD) measurement. Every such RSTD determines a hyperbola, and the interested point of these hyperbolas can be considered as the device position. Here, the reference cell is selected by the device and the RSTD measurement can be performed on an intra-frequency cell (reference cell/neighbor cell are on the same carrier frequency as the serving cell) or inter-frequency cell (at least one of reference cell/neighbor cell is on the different carrier frequency from the serving cell).

While OTDOA is the supported method for FeMTC UEs, it has been also recently supported in Release 14 enhancement for NB-IoT:
  Baseline signal(s) are: NB-IoT Release 13 signals, LTE Cell-specific reference signals (CRS)/Positioning Reference Signals (PRS) in 1 PRB;

To use a new signal other than above, RAN1 should find substantial performance/UE complexity benefit over using a signal in the above list, without significant UE complexity or power consumption impact.

Therefore, there is a need that new agreements and requirements be set for positioning support of these UEs.

SUMMARY

According to certain embodiments, a method is disclosed for use in a wireless device that is configured as a NB-IoT device or an MTC device. The method comprises determining at least one parameter related to positioning. The at least one parameter is based on a capability of the wireless device that relates to OTDOA positioning with NB-IoT or MTC. The method further comprises using the determined at least one parameter related to positioning.

According to certain embodiments, a wireless device is configured as a NB-IoT device or an MTC device. The wireless device comprises memory operable to store instructions and processing circuitry operable to execute the instructions, whereby the wireless device is operable to determine at least one parameter related to positioning. The at least one parameter is based on a capability of the wireless device that relates to OTDOA positioning with NB-IoT or MTC. The wireless device is further operable to use the determined at least one parameter related to positioning.

According to certain embodiments, a computer program product comprises a non-transitory computer readable medium storing computer readable program code. The computer readable program code comprises program code for determining at least one parameter related to positioning. The at least one parameter is based on a capability of the wireless device that relates to OTDOA positioning with NB-IoT or MTC. The computer readable program code further comprises program code for using the determined at least one parameter related to positioning.

The above-described method, wireless device, and/or computer program product may include various other features, including any one or more of the following:

In certain embodiments, the method/wireless device/computer program product receives OTDOA assistance data from a network, wherein the OTDOA assistance data assists the wireless device in performing an operation related to OTDOA positioning with NB-IoT or MTC.

In certain embodiments, the OTDOA assistance data is received in a broadcast message or a multicast message.

In certain embodiments, the OTDOA assistance data is received in a unicast message.

In certain embodiments, the OTDOA assistance data indicates a reference cell, a neighbor cell, and/or a frequency to be measured by the wireless device when performing an RSTD measurement.

In certain embodiments, the OTDOA assistance data indicates a PRS configuration.

In certain embodiments, the OTDOA assistance data comprises a PRS subframe offset.

In certain embodiments, the method/wireless device/computer program product further provide the network with information about the capability of the wireless device that relates to OTDOA positioning with NB-IoT or MTC.

In certain embodiments, the information about the capability of the wireless device is provided in response to receiving a positioning request from the network.

In certain embodiments, the information about the capability of the wireless device is provided to a network node via RRC signaling.

In certain embodiments, the information about the capability of the wireless device is provided to a location server via LPP signaling.

In certain embodiments, the capability of the wireless device that relates to OTDOA positioning with NB-IoT or MTC comprises at least one of: bandwidth, sampling rate, support for inter-frequency measurements, coverage class, support for positioning, number of receive antennas, UE category, and/or a protocol release supported by the wireless device.

In certain embodiments, the capability of the wireless device that relates to OTDOA positioning with NB-IoT or MTC comprises battery status.

In certain embodiments, the determined at least one parameter comprises a minimum number of repetitions of a DL reference signal that the wireless device is to aggregate when performing an operation related to positioning.

In certain embodiments, the minimum number of repetitions is determined from a set of values corresponding to different Signal-to-Interference plus Noise Ratios (SINRs).

In certain embodiments, the determined at least one parameter comprises a maximum response time that the wireless device is to use when performing an operation related to positioning.

In certain embodiments, the method/wireless device/computer program product uses the determined at least one parameter related to positioning by performing at least one OTDOA measurement based on the determined at least one parameter.

In certain embodiments, the method/wireless device/computer program product sends a result of the at least one OTDOA measurement to another node.

In certain embodiments, the method/wireless device/computer program product uses a result of the at least one OTDOA measurement for one or more operations related to positioning.

In certain embodiments, using the determined at least one parameter related to positioning comprises calculating a location of the wireless device.

In certain embodiments, the at least one parameter related to positioning is determined based on a pre-defined rule.

In certain embodiments, the at least one parameter related to positioning is received from the network.

In certain embodiments, MTC comprises an FeMTC version of MTC.

According to certain embodiments, a method is disclosed for use in a network node. The method comprises generating OTDOA assistance data for assisting a wireless device in OTDOA positioning with NB-IoT or MTC. The method further comprises sending the OTDOA assistance data to the wireless device.

According to certain embodiments, a network node comprises memory operable to store instructions and processing circuitry operable to execute the instructions, whereby the network node is operable to generate OTDOA assistance data for assisting a wireless device in OTDOA positioning with NB-IoT or MTC. The network node is further operable to send the OTDOA assistance data to the wireless device.

According to certain embodiments, a computer program product comprises a non-transitory computer readable medium storing computer readable program code. The computer readable program code comprises program code for generating OTDOA assistance data for assisting a wireless device in OTDOA positioning with NB-IoT or MTC. The computer readable program code further comprises program code for sending the OTDOA assistance data to the wireless device.

The above-described method, network node, and/or computer program product may include various other features, including any one or more of the following:

In certain embodiments, the OTDOA assistance data is sent in a broadcast message or a multicast message.

In certain embodiments, the OTDOA assistance data is sent in a unicast message.

In certain embodiments, the OTDOA assistance data indicates a reference cell, a neighbor cell, and/or a frequency to be measured by the wireless device when performing an RSTD measurement.

In certain embodiments, the OTDOA assistance data indicates a PRS configuration.

In certain embodiments, the OTDOA assistance data comprises a PRS subframe offset.

In certain embodiments, the OTDOA assistance data is based on the capability of the wireless device.

In certain embodiments, the method/network node/computer program product sends a positioning request that requests the wireless device to provide information about the capability of the wireless device that relates to OTDOA positioning with NB-IoT or MTC.

In certain embodiments, the method/network node/computer program product receives, from the wireless device, information about the capability of the wireless device that relates to OTDOA positioning with NB-IoT or MTC.

In certain embodiments, the information about the capability of the wireless device is received via RRC signaling.

In certain embodiments, the method/network node/computer program product saves at least a portion of the information about the capability of the wireless device for use in future positioning events.

In certain embodiments, the OTDOA assistance data is determined at least in part based on information that the network node has previously saved about the capability of the wireless device such that the network node does not need to request the wireless device to send the previously saved information.

In certain embodiments, the capability of the wireless device that relates to OTDOA positioning with NB-IoT or MTC comprises at least one of: bandwidth, sampling rate, support for inter-frequency measurements, coverage class, support for positioning, number of receive antennas, UE category, and/or a protocol release supported by the wireless device.

In certain embodiments, the capability of the wireless device that relates to OTDOA positioning with NB-IoT or MTC comprises battery status.

In certain embodiments, the OTDOA assistance information indicates a minimum number of repetitions of a DL reference signal that the wireless device is to aggregate when performing an operation related to positioning.

In certain embodiments, the OTDOA assistance data comprises a set of values from which the wireless device selects the minimum number of repetitions based on SINRs.

In certain embodiments, the OTDOA assistance data indicates a maximum response time that the wireless device is to use when performing an operation related to positioning.

In certain embodiments, the method/network node/computer program product receives, from the wireless device, a result of using the OTDOA assistance data.

In certain embodiments, the method/network node/computer program product sends the received result to another node.

In certain embodiments, the method/network node/computer program product uses the received result in an operation related to positioning.

In certain embodiments, using the received result in an operation related to positioning comprises calculating a location of the wireless device.

In certain embodiments, generating the OTDOA assistance data comprises determining fields to add or remove to the OTDOA assistance data based on the capabilities of the wireless device.

In certain embodiments, determining fields to remove comprises avoiding unnecessary OTDOA signaling fields that do not benefit the wireless device.

In certain embodiments, the method/network node/computer program product predicts a positioning response time of the wireless device based on an amount of required repetitions.

In certain embodiments, MTC comprises an FeMTC version of MTC.

According to one example embodiment, a method in a user equipment is disclosed. The method comprises determining, based on a UE capability related to OTDOA positioning with NB-IoT or FeMTC known or available to the UE, at least one parameter related to OTDOA positioning with NB-IoT or FeMTC. The method comprises performing at least one OTDOA measurement based on the determined at least one parameter. In certain embodiments, one or more of the following may apply:

the method may comprise maintaining a UE capability related to OTDOA positioning with NB-IoT or FeMTC;

the UE capability related to OTDOA positioning with NB-IoT or FeMTC may comprise a parameter, which is known or available to the UE, representing or indicating a capability related to OTDOA positioning with NB-IoT or FeMTC;

the method may comprise signaling the UE capability to the network (e.g., network node such as an eNB or E-SMLC);

the method may comprise sending a result of the at least one OTDOA measurement to another node;

the method may comprise using a result of the at least one OTDOA measurement for one or more operations related to positioning;

determining, based on the maintained UE capability, at least one parameter related to OTDOA positioning with NB-IoT or FeMTC may comprise obtaining the at least one parameter related to OTDOA positioning based on one or more of a message or an indication received from another node the one or more of the message or the indication received from another node may comprise OTDOA network assistance data received from a network node such as an E-SMLC or an eNB;

determining, based on the maintained UE capability, at least one parameter related to OTDOA positioning with NB-IoT or FeMTC may comprise determining the at least one parameter related to OTDOA positioning based on one or more pre-defined rules;

the positioning purpose may comprise calculating a location of the UE;

maintaining the UE capability related to OTDOA positioning with NB-IoT or FeMTC may comprise storing the UE capability in memory; and the determined at least one parameter related to OTDOA positioning with NB-IoT or FeMTC may comprise a number of necessary repetitions for aggregating a DL reference signal.

According to another example embodiment, a user equipment is disclosed. The user equipment comprises one or more processors. The one or more processors are configured to determine, based on a UE capability related to OTDOA positioning with NB-IoT or FeMTC known or available to the UE, at least one parameter related to OTDOA positioning with NB-IoT or FeMTC. The one or more processors are configured to perform at least one OTDOA measurement based on the determined at least one parameter.

According to another example embodiment, a method in a network node is disclosed. The method comprises determining, based on a UE capability, at least one parameter related to OTDOA positioning with NB-IoT or FeMTC. The method comprises generating OTDOA assistance data based on the determined at least one parameter. The method comprises sending the generated OTDOA assistance data to one or more UEs. In certain embodiments, one or more of the following may apply:

- the method may comprise receiving a UE capability related to OTDOA positioning with NB-IoT or FeMTC;
- the method may comprise avoiding unnecessary OTDOA signaling fields that do not benefit, for example, NB-IoT devices;
- the method may comprise receiving, from the UE, a result of using the sent OTDOA assistance data;
- the method may comprise sending the received result of using the sent OTDOA assistance data to another node;
- the method may comprise using the received result of using the sent OTDOA assistance data for a positioning purpose;
- using the received result may comprise calculating a location of the UE; and
- the determined at least one parameter related to OTDOA positioning with NB-IoT or FeMTC may comprise a number of necessary repetitions for aggregating a DL reference signal.

According to another example embodiment, a network node is disclosed. The network node comprises one or more processors. The one or more processors are configured to determine, based on a UE capability, at least one parameter related to OTDOA positioning with NB-IoT or FeMTC. The one or more processors are configured to generate OTDOA assistance data based on the determined at least one parameter. The one or more processors are configured to send the generated OTDOA assistance data to one or more UEs.

Certain embodiments of the present disclosure may provide one or more technical advantages. For example, certain embodiments may advantageously tailor the network OTDOA assistance data for FeMTC and NB-IoT UEs by both adding and removing fields in accordance to the device needs. As another example, certain embodiments may advantageously assist the UEs to properly select the number of repetitions they require to perform a proper positioning estimation. As still another example, certain embodiments may advantageously minimize the complexity and power consumption at the UE side. As yet another example, certain embodiments may advantageously enable the network to predict the positioning response time based on the amount of required repetitions from the NB-IoT UE. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
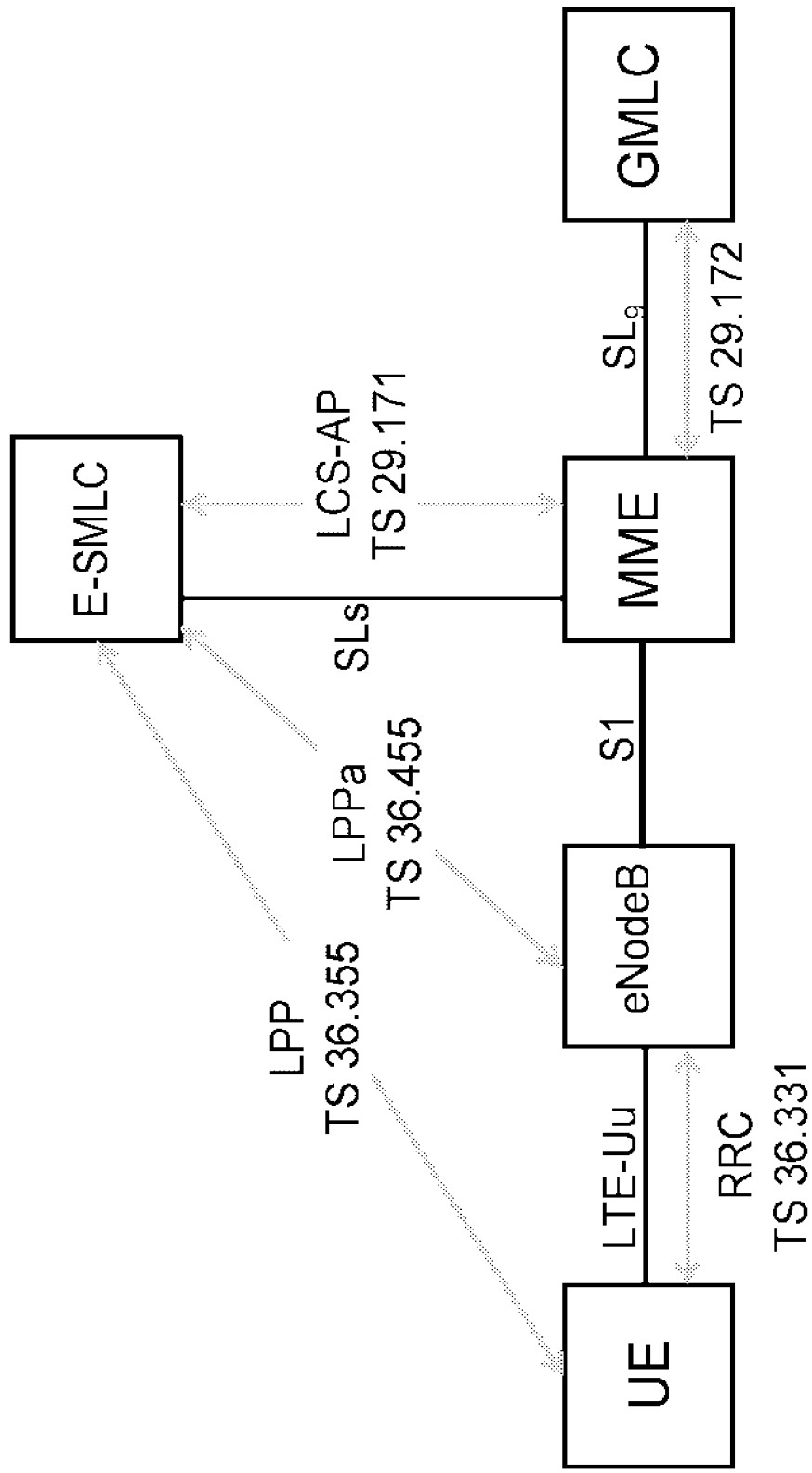
FIG. 1 illustrates the LTE positioning architecture.
Figure 2:
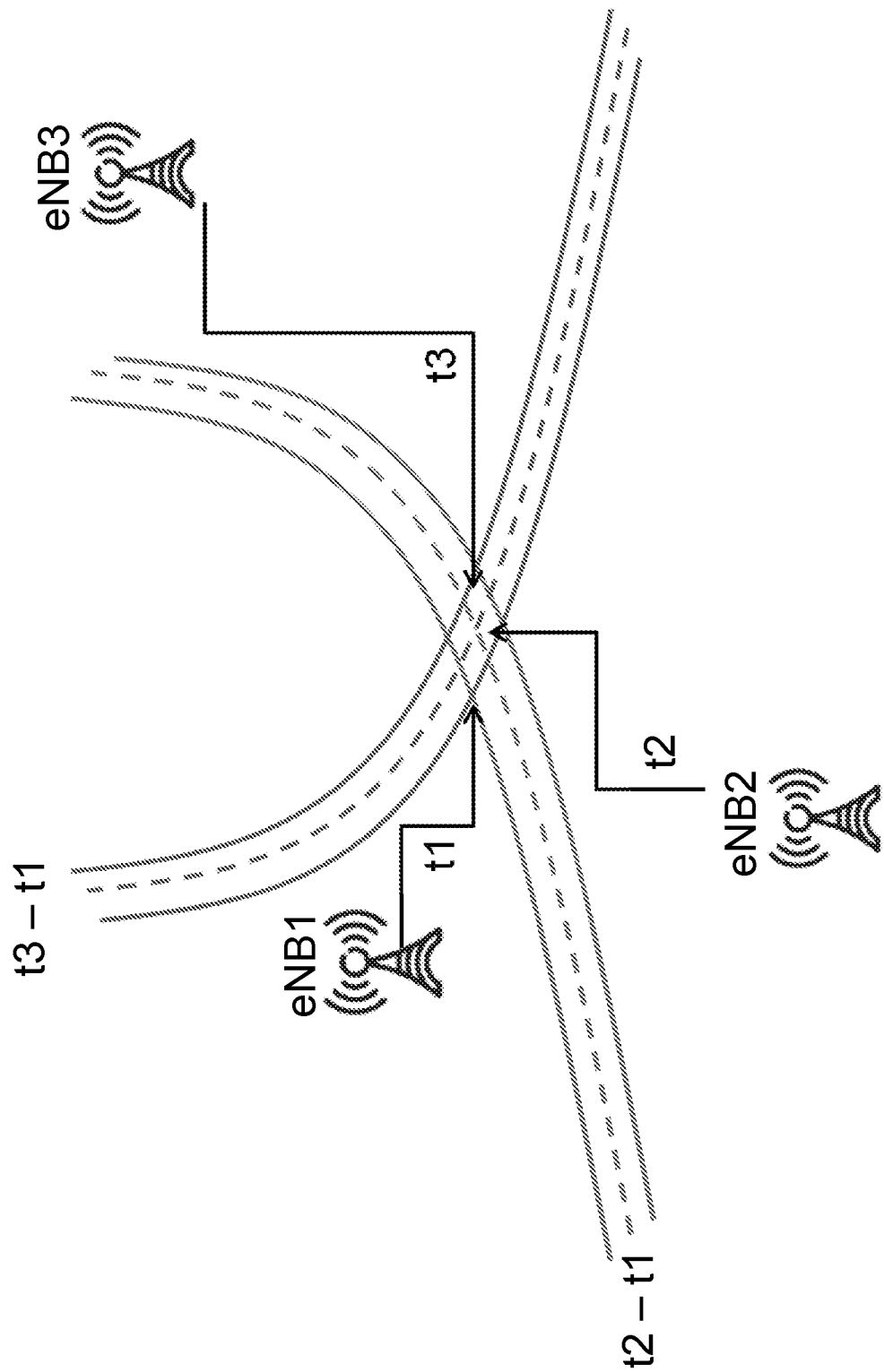
FIG. 2 illustrates OTDOA position estimation based on multi-lateration of the RSTD measurements.

OTDOA has been selected as a positioning method for NB-IoT UEs. The Release 13 NB-IoT capabilities in terms of sampling rate and timing accuracy requirements are limited, however, which results in low accuracy position estimations. While the relaxing of requirements on NB-IoT generally does not limit the usefulness of NB-IoT devices to a great extent, positioning applications are affected more severely. Therefore, in case of OTDOA these requirements would be revisited for Release 14 NB-IoT. These devices are assumed to have low complexity and low power consumption. To maintain these characteristics in DL-based positioning, in which the UE should measure some DL signals, it is crucial to either provide more network assistance to these devices or to provide similar assistance by causing the devices to perform said positioning differently in different circumstances. Furthermore, when the network supports OTDOA for all of legacy UEs, MTC UEs and NB-IoT devices, some indication of UE capabilities at the network side may facilitate proper UE assistance.

The present disclosure contemplates various embodiments that may address the above described issues with existing approaches. In certain embodiments, better positioning accuracy for NB-IoT devices is enabled by providing network assistance based on the capability of the device. In some cases, the network can assist the UE in the number of considered DL reference signal repetitions.

According to one example embodiment, a method in a UE is disclosed. The UE determines, based on a UE capability related to OTDOA positioning with NB-IoT or FeMTC known or available to the UE, at least one parameter related to OTDOA positioning with NB-IoT or FeMTC. In some cases, determining the at least one parameter related to OTDOA positioning with NB-IoT or FeMTC may comprise obtaining the at least one parameter based on a message or indication received from another node (e.g., OTDOA network assistance data received from a network node such as E-SMLC or eNodeB). In some cases, determining the at least one parameter related to OTDOA positioning with NB-IoT or FeMTC may comprise determining the at least one parameter based on one or more pre-defined rules. In some cases, the UE maintains (for example, stores) a UE capability related to OTDOA positioning with NB-IoT or FeMTC. The UE capability may comprise a parameter, which is known or available to the UE, representing or indicating a capability related to OTDOA positioning with NB-IoT or FeMTC. In some cases, the UE may signal the UE capability to the network. The UE performs at least one OTDOA measurement based on the determined at least one parameter. In some cases, the UE may send a result of the at least one OTDOA measurement to another node (e.g., E-SMLC or eNodeB). In some cases, the UE may use the result of the at least one OTDOA measurement for one or more operations related to positioning (e.g., calculating UE location).

According to another example embodiment, a method in a network node is disclosed. The network node determines, based on a UE capability, at least one parameter related to OTDOA positioning with NB-IoT or FeMTC. In some cases, the network node may receive the UE capability related to OTDOA positioning with NB-IoT or FeMTC. The network node generates OTDOA assistance data based on the determined parameter. The network node sends the generated OTDOA assistance data to one or more UEs (e.g., via unicast, multicast, or broadcast signaling). In some cases, the network node avoids unnecessary OTDOA signaling fields which does not benefit, for example, NB-IoT devices. In some cases, the network node receives, from the UE, a result of using the sent OTDOA assistance data and, in some cases, sends the result to another node or uses it for a positioning purpose (e.g., calculate UE location).

Certain embodiments of the present disclosure may provide one or more technical advantages. For example, certain embodiments may advantageously tailor the network OTDOA assistance data for FeMTC and NB-IoT UEs by both adding and removing fields in accordance to the device needs. As another example, certain embodiments may advantageously assist the UEs to properly select the number of repetitions they require to perform a proper positioning estimation. As still another example, certain embodiments may advantageously minimize the complexity and power consumption at the UE side. As yet another example, certain embodiments may advantageously enable the network to predict the positioning response time based on the amount of required repetitions from the NB-IoT UE. Other advantages may be readily apparent to one having skill in the art. Certain embodiments may have none, some, or all of the recited advantages.

Figure 3:
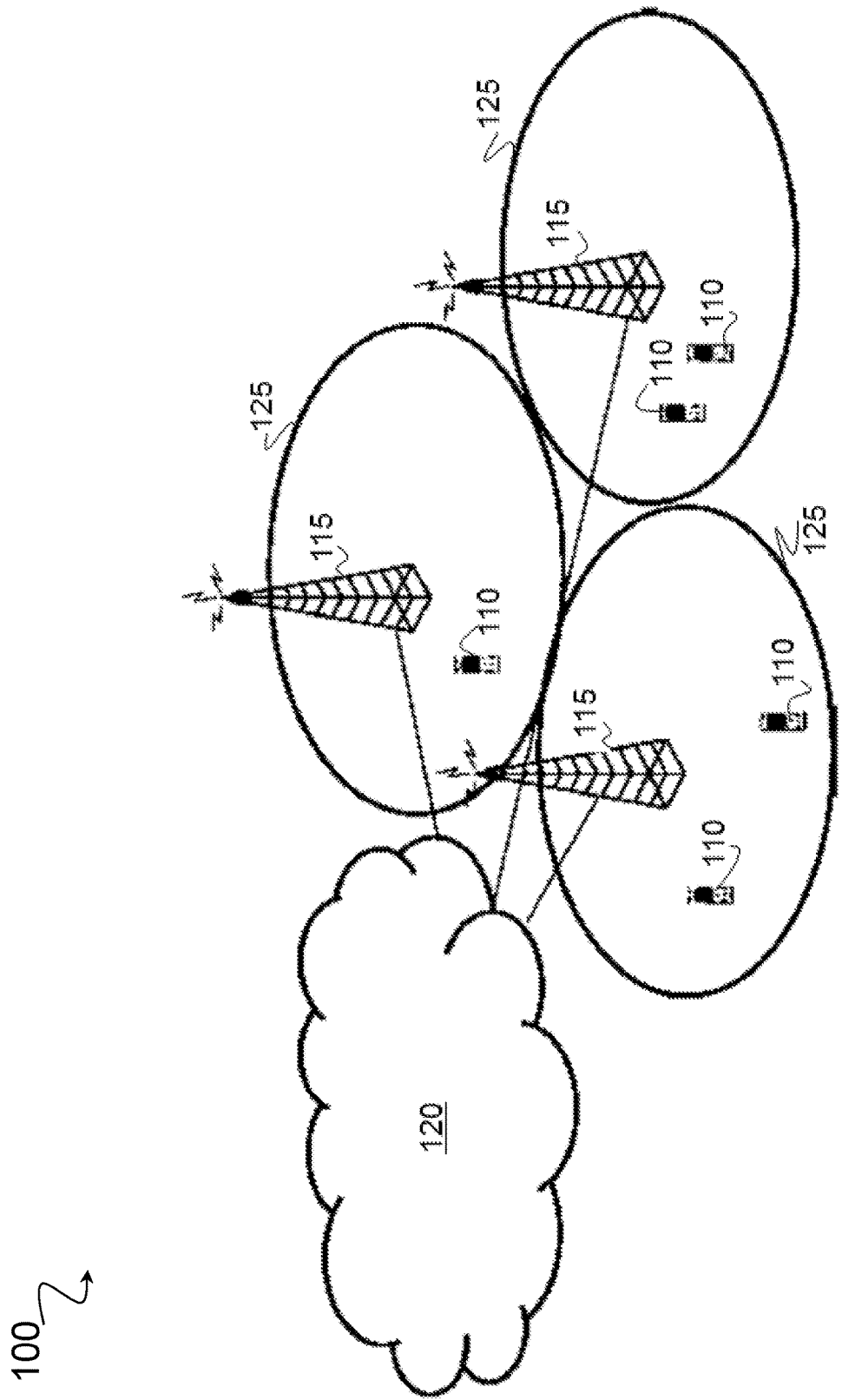
FIG. 3 is a block diagram illustrating an embodiment of a network 100, in accordance with certain embodiments.

FIG. 3 is a block diagram illustrating an embodiment of a network 100, in accordance with certain embodiments. Network 100 includes one or more UE(s) 110 (which may be interchangeably referred to as wireless devices 110) and one or more network node(s) 115 (which may be interchangeably referred to as eNBs 115). UEs 110 may communicate with network nodes 115 over a wireless interface. For example, a UE 110 may transmit wireless signals to one or more network nodes 115, and/or receive wireless signals from one or more network nodes 115. The wireless signals may contain voice traffic, data traffic, control signals, and/or any other suitable information. In some embodiments, an area of wireless signal coverage associated with a network node 115 may be referred to as a cell 125. In some embodiments, UEs 110 may have device-to-device (D2D) capability. Thus, UEs 110 may be able to receive signals from and/or transmit signals directly to another UE.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network 120. Interconnecting network 120 may refer to any interconnecting system capable of transmitting audio, video, signals, data, messages, or any combination of the preceding. Interconnecting network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum (NAS) layer. In non-access stratum signaling, signals between UEs 110 and the core network node may be transparently passed through the radio access network. In certain embodiments, network nodes 115 may interface with one or more network nodes over an internode interface, such as, for example, an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, NB-IoT device, machine-type-communication UE or UE capable of machine-to-machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on). In some cases, UE 110 may also operate in out-of-coverage scenarios.

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and UE should be considered non-limiting and, in particular, does not imply a certain hierarchical relation between the two; in general, "eNodeB" could be considered as device 1 and "UE" device 2, and these two devices communicate with each other over some radio channel.

Example embodiments of UE 110, network nodes 115, and other network nodes (such as radio network controller or core network node) are described in more detail below with respect to FIGS. 7-11.

Although FIG. 3 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in an LTE network, the embodiments may be implemented in any appropriate type of telecommunication system supporting any suitable communication standards (including 5G standards) and using any suitable components, and are applicable to any radio access technology (RAT) or multi-RAT systems in which a UE receives and/or transmits signals (e.g., data). For example, the various embodiments described herein may be applicable to IoT, NB-IoT, LTE, LTE-Advanced, 5G, UMTS, HSPA, GSM, cdma2000, WCDMA, WiMax, UMB, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink (UL).

As described above, certain embodiments may advantageously exploit FeMTC and NB-IoT UE capabilities in providing proper OTDOA network assistance information, which helps the UE in optimally determining the number of necessary repetitions for obtaining a decent positioning accuracy.

One advantage in considering the OTDOA method as the positioning method candidate for FeMTC and NB-IoT UEs is to keep the legacy signaling procedure for these devices as it was for legacy LTE UEs. In LTE, there is a certain LPP signaling from the E-SMLC to the UE that provides OTDOA network assistance information. This signaling can definitely be useful for FeMTC and NB-IoT devices considering the limited capability and power consumption that these devices have. Therefore, it is well justified to keep this signaling for these devices. However, the content of this signaling should be different and tailored to the capabilities and requirements of these UEs. The appropriate network assistance information that can be relevant and helpful in providing better positioning performance for these devices is described in more detail below.

As described above, in certain embodiments a method in UE is disclosed. According to one example embodiment, the method comprises the following steps:

Step 1: Determine, based on a UE capability related to OTDOA positioning with NB-IoT or FeMTC known or available to the UE, at least one parameter related to OTDOA positioning with NB-IoT or FeMTC.

Step 2: Perform at least one OTDOA measurement based on the determined at least one parameter.

In certain embodiments, the UE may maintain a UE capability related to OTDOA positioning with NB-IoT or FeMTC. The UE capability related to OTDOA positioning with NB-IoT or FeMTC may comprise a parameter, which is known or available to the UE, representing or indicating a capability related to OTDOA positioning with NB-IoT or FeMTC. In some cases, the UE may signal the UE capability to the network.

The UE may determine the at least one parameter related to OTDOA positioning with NB-IoT or FeMTC in any suitable manner. For example, in certain embodiments determining, based on the UE capability related to OTDOA positioning with NB-IoT or FeMTC known or available to the UE, at least one parameter related to OTDOA positioning with NB-IoT or FeMTC may comprise one or more of: obtaining the at least one parameter related to OTDOA positioning based on one or more of a message or an indication received from another node (e.g., OTDOA network assistance data received from a network node such as E-SMLC or eNodeB); and determining the at least one parameter related to OTDOA positioning based on one or more pre-defined rules.

In some cases, the UE may send a result of the at least one OTDOA measurement to another node (e.g., E-SMLC or eNodeB). In some cases, the UE may use a result of the at least one OTDOA measurement for one or more operations related to positioning (e.g., calculating UE location).

In certain embodiments, a method in a network node is disclosed. According to another example embodiment, the method comprises the following steps:

Step 1: Determine, based on a UE equipment capability, at least one parameter related to OTDOA positioning with NB-IoT or FeMTC.

Step 2: Generate OTDOA assistance data based on the determined at least one parameter.

Step 3: Send the generated OTDOA assistance data to one or more UEs (e.g., via unicast, multicast, or broadcast signaling).

In certain embodiments, the network node may receive a UE capability related to OTDOA positioning with NB-IoT or FeMTC. For example, the network node may receive the UE capability related to positioning with NB-IoT or FeMTC from the UE or from another node (e.g., another network node). In certain embodiments, the method may comprise avoiding unnecessary OTDOA signaling fields that do not benefit, for example, NB-IoT devices. In certain embodiments, the method may comprise receiving, from the UE, a result of using the sent OTDOA assistance data and sending it to another node or using it for a positioning purpose (e.g., calculating UE location).

Various aspects of the above described example embodiments are described in detail below. These aspects may be applicable to one or more of the example embodiments described herein (including the example methods in a network node and UE described above).

1.1 UE Capability Related to OTDOA Positioning with NB-IoT or FeMTC

There will be certain requirements set for RSTD reporting measurement accuracy, and the network would have such baseline settings. These requirements, however, are considered as minimum capabilities that the NB-IoT UE should have. There is a possibility that some UEs have been implemented with better capabilities and hence, by signaling this information to the network, the network can provide a better positioning assistance.

Examples of the UE capabilities include, but are not limited to, one or more of:
- Bandwidth;
- Sampling rate;
- Support for inter-frequency measurements;
- Coverage class;
- Support for positioning;
- Number of receive antennas;
- UE category;
- Battery status; and
- Other information that can potentially help improve the positioning accuracy.

According to one example embodiment, the UE can provide its capability to the network node in response to a positioning request sent from the network. In some cases, this information may be provided by the UE every time there is a positioning need. However, these capabilities are mainly stable parameters that would not change over time. Hence, in some cases the information regarding UE capabilities can be sent once to the network and saved at the network side for future positioning events. By saving the capabilities at the network side, the UE does not have to provide the capabilities every time there is a positioning need. This reduces signaling overhead, which in turn reduces the amount of UE resources consumed for positioning. Reducing the amount of resources consumed by the UE may be particularly advantageous for NB-IoT and MTC UEs, which tend to have relatively limited resources. In another embodiment, some of these parameters, such as battery status, relate to a particular time the positioning is requested, and hence the network can assist a more careful configuration in terms of frequent positioning for low battery level devices.

The present disclosure contemplates that the UE may signal its capability to the network in any suitable manner. According to one example embodiment, this signaling can be done on RRC protocol and sent to the network node (e.g., eNB), and in another embodiment, it can be on LPP protocol and sent to the location server (e.g., E-SMLC). In some cases, the information can also be kept in both network levels. For the former case, however, as the network assistance information would be sent from the location server to the UE, there should be some LPPa signaling to transfer this information from the network node to the location server.

While it is more expected that FeMTC and NB-IoT UEs only send the RSTD measurements to the network and the positioning estimation would be derived at the location server, there may still be UEs capable of doing the UE-based positioning, in this case the capability can be also signaled to the network.

Figure 4:
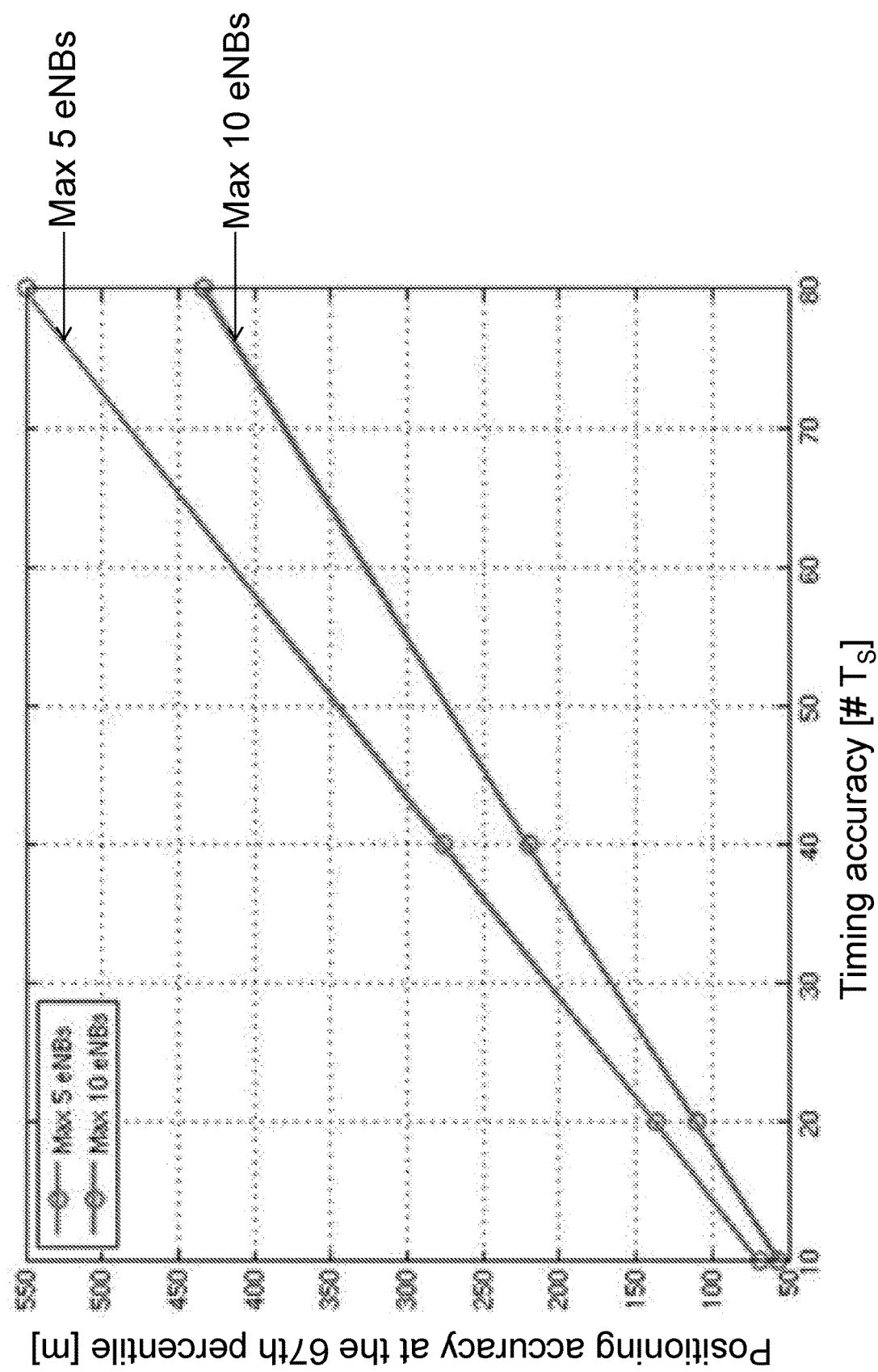
FIG. 4 illustrates timing accuracy limitation on positioning performance, in accordance with certain embodiments

FIG. 4 illustrates timing accuracy limitation on positioning performance, in accordance with certain embodiments. More particularly, FIG. 4 illustrates timing accuracy limitation on positioning performance of Release 13 NB-IoT. The limitation of NB-IoT Release 13 UEs sampling rate is shown in FIG. 4. Now that OTDOA is supported for these devices, it is likely that the requirement of 80 Ts timing accuracy for these devices would be modified for positioning purposes.

No matter if this requirement would become improved or not, there are still possibilities that we have NB-IoT devices with better capabilities, this number is only the minimum requirement. Therefore, to provide a better positioning accuracy at the location server, an idea would be to communicate on LPP and to get a report from the UE if it has Release 13 capability, or Release 14 capability or etc.

1.2 Determine, Based on the Maintained UE Capability, at Least One Parameter Related to OTDOA Positioning with NB-IoT or FeMTC While the location server is informed about the capabilities of the UE based on any way presented in the previous step, it can provide a suitable OTDOA network assistance information for that specific UE.

One parameter that is important to be considered here is that these UEs should aggregate the DL reference signal (e.g., PRS) for several/many occasions (repetitions) based on their bandwidth in order to obtain a proper TOA estimation, which results in an acceptable positioning estimation. While this would also impact the response time, it is important that the network assist the UE for an optimum performance in this regard.

According to one example embodiment, the UE can determine the number of necessary repetitions itself (e.g., based on one or more of one or more pre-defined rules and one or more requirements that are specified by the network). In another example embodiment, the network can suggest a minimum number of repetition or a maximum response time to the UE. In some cases, the UE determined number of necessary repetitions can correspond to a single value. In some cases, the determined number of necessary repetitions can correspond to a set of values corresponding to different SINRs.

1.3 Perform at Least One OTDOA Measurement, Based on the Determined Parameter In certain embodiments, the UE performs RSTD measurements either based on the assisted rules and requirements sent by the location server, or performs the measurements according to its own preferences. In certain embodiments, the network may be informed about the UE's selection in order to use the RSTD measurements for positioning estimation in the most proper way.

According to one example embodiment, the UE can report the number of PRS subframes used during the positioning time interval and its measured RSRP/RSRQ, so that the location server can build up an optimal PRS resource allocation based on UE reports.

1.4 To Avoid Unnecessary OTDOA Signaling Fields which Does Not Benefit NB-IoT Devices While it is required to consider adding new fields to the OTDOA Network Assistance Information signaling for NB-IoT, removing unnecessary signaling fields is also beneficial in order to limit the overall signaling overhead for the OTDOA method. In certain embodiments, in case of irrelevant information, the UE can simply neglect that information.

For example, if the UE is not capable of having inter-frequency measurements, then no assistance information in terms of inter-frequency measurements would be signaled to the UE in order to minimize the signaling overhead. As another non-limiting example, there is no need to signal CP information as currently NB-IoT only supports normal CP (if both normal CP and extended CP are supported for PRS in NB-IoT, this CP info is still needed.)

1.5 Signaling Support Via LPP

In order for the current signaling to cover FeMTC and NB-IoT devices and to support the various embodiments described herein, there may be several modifications needed in the signaling mainly on LPP protocol (as described in 3GPP RP-161324, "New work item proposal: Enhancements of NB-IoT," source Vodafone, Huawei, HiSilicon, Ericsson, Qualcomm, 3GPP TSG RAN Meeting #72, Busan, Korea, Jun. 13-16, 2016).

A non-exclusive example is given as follows, with reference to 3GPP TS 36.355 "3rd Generation Partnership Project; Technical Specification Group Radio Access Network; Evolved Universal Terrestrial Radio Access (E-UTRA); LTE Positioning Protocol (LPP) (Release 13)" V13.2.0 (2016-09). First of all, "n1" should be added to the prs-Bandwidth field to cover NB-IoT bandwidth. For NB-IoT, prs-ConfiguraitonIndex may carry a different meaning or one or more new configuration parameters may be introduced. The set of numDL-Frames may be enlarged as well. The prs-MutingInfo-r9 may be revised/enriched as well. For example:

```
-- ASN1START
PRS-Info ::= SEQUENCE {
    prs-Bandwidth       ENUMERATED {n1, n6, n15, n25, n50, n75,
                                    n100, ... },
    prs-ConfigurationIndex  INTEGER (0..4095),
    numDL-Frames        ENUMERATED {sf-1, sf-2, sf-4, sf-6, ...},
    ...,
    prs-MutingInfo-r9   CHOICE {
        po2-r9          BIT STRING (SIZE(2)),
        po4-r9          BIT STRING (SIZE(4)),
        po8-r9          BIT STRING (SIZE(8)),
        po16-r9         BIT STRING (STZE(16)),
        ...
    }                                   OPTIONAL   -- Need OP
}
-- ASN1STOP
```

Here, n1 (representing one resource block) is proposed as a further allowed value of prs-Bandwidth.

The OTDOA-ReferenceCellInfo and OTDOA-NeighbourCellInfoList can contain the minPRSSubframe that is required for the device to perform the measurements, while the network can give a more strategy rule, one simple modification is to indicate a minimum number based on the UE's capabilities.

```
-- ASN1START
OTDOA-ReferenceCellInfo ::= SEQUENCE {
    physCellId              INTEGER (0..503),
    cellGlobalId            ECGI                        OPTIONAL,   -- Need ON
    earfcnRef               ARFCN-ValueEUTRA            OPTIONAL,   -- Cond
NotSameAsServ0
    antennaPortConfig       ENUMERATED {ports1-or-2, ports4, ... }
                                                        OPTIONAL,   -- Cond
NotSameAsServ1
    cpLength                ENUMERATED { normal, extended, ... },
    prsInfo                 PRS-Info                    OPTIONAL,   -- Cond PRS
    minPRSSubframe          ENUMERATED {1..600..}       OPTIONAL,   -- Need ON
    ...,
    [[ earfcnRef-v9a0       ARFCN-ValueEUTRA-v9a0       OPTIONAL    -- Cond
NotSameAsServ2
    ]]
}
-- ASN1STOP
```

Here, minPRSSubframe is proposed as a new variable under NotSameAsServ1. It indicates the number of subframe over which the UE is to aggregate the DL reference signal (e.g., the PRS). In relatively better radio conditions, minPRSSubframe can be set to a relatively lower value, and vice versa.

```
-- ASN1START
OTDOA-NeighbourCellInfoList ::= SEQUENCE (SIZE (1..maxFreqLayers)) OF OTDOA-NeighbourFreqInfo
OTDOA-NeighbourFreqInfo ::= SEQUENCE (SIZE (1..24)) OF OTDOA-NeighbourCellInfoElement
OTDOA-NeighbourCellInfoElement ::= SEQUENCE {
    physCellId              INTEGER (0..503),
    cellGlobalId            ECGI                        OPTIONAL,   -- Need ON
    earfcn                  ARFCN-ValueEUTRA OPTIONAL,              -- Cond
NotSameAsRef0
    cpLength                ENUMERATED {normal, extended, ...}
                                                        OPTIONAL,   -- Cond
NotSameAsRef1
    prsInfo                 PRS-Info                    OPTIONAL,   -- Cond
    minPRSSubframe          ENUMERATED {1..600..}       OPTIONAL,   -- Need ON
NotSameAsRef2
    antennaPortConfig       ENUMERATED {ports-1-or-2, ports-4, ...}
                                                        OPTIONAL,   -- Cond
NotsameAsRef3
    slotNumberOffset        INTEGER (0..19)             OPTIONAL,   -- Cond
NotSameAsRef4
    prs-SubframeOffset      INTEGER (0..1279)           OPTIONAL,   -- Cond
```

-continued

```
InterFreq
    expectedRSTD              INTEGER (0..16383),
    expectedRSTD-Uncertainty  INTEGER (0..1023),
    ...,
    [[ earfcn-v9a0            ARFCN-ValueEUTRA-v9a0         OPTIONAL        -- Cond
NotSameAsRef5
    ]]
}
maxFreqLayers   INTEGER ::= 3
-- ASN1STOP
```

Here, minPRSSubframe is proposed as a new variable under NotSameAsRef1. It indicates the number of subframe over which the UE is to aggregate the DL reference signal (e.g., the PRS). In relatively better radio conditions, minPRSSubframe can be set to a relatively lower value, and vice versa.

Figure 5:
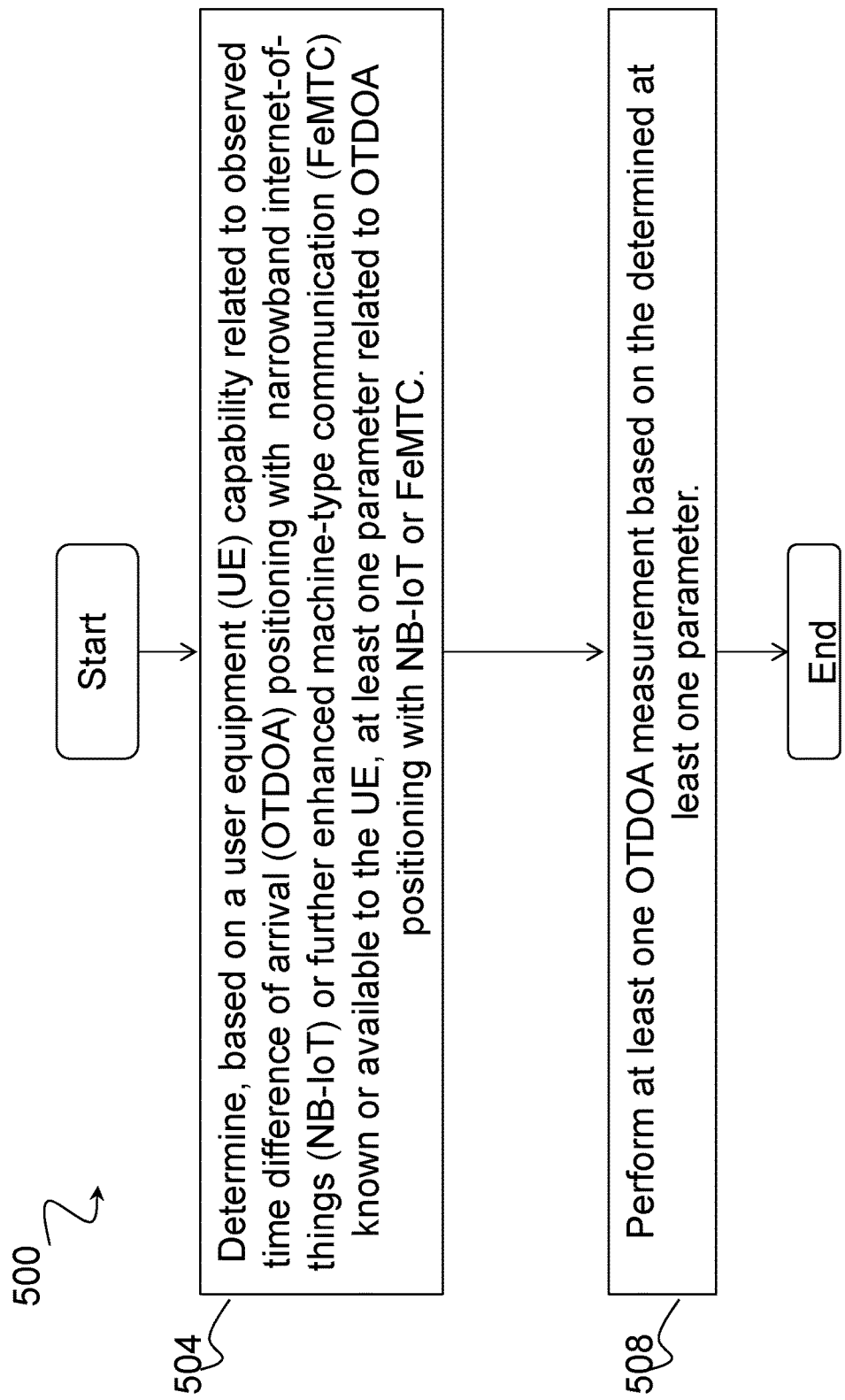
FIG. 5 is a flow diagram of a method in a user equipment, in accordance with certain embodiments.

FIG. 5 is a flow diagram of a method in a user equipment, in accordance with certain embodiments. The method begins at step 504, where the UE determines, based on a UE capability related to OTDOA positioning with NB-IoT or FeMTC known or available to the UE, at least one parameter related to OTDOA positioning with NB-IoT or FeMTC.

In certain embodiments, the UE may maintain a UE capability related to OTDOA positioning with NB-IoT or FeMTC. The UE capability related to OTDOA positioning with NB-IoT or FeMTC may comprise a parameter, which is known or available to the UE, representing or indicating a capability related to OTDOA positioning with NB-IoT or FeMTC. In some cases, maintaining the UE capability related to OTDOA positioning with NB-IoT or FeMTC may comprise storing the UE capability in memory. In certain embodiments, the method may comprise signaling the UE capability to the network (e.g., to a network node such as eNB or E-SMLC).

In certain embodiments, determining the at least one parameter related to OTDOA positioning with NB-IoT or FeMTC may comprise obtaining the at least one parameter related to OTDOA positioning based on one or more of a message or an indication received from another node (e.g., OTDOA network assistance data received from a network node such as E-SMLC or eNodeB). In certain embodiments, determining the at least one parameter related to OTDOA positioning with NB-IoT or FeMTC may comprise determining the at least one parameter related to OTDOA positioning based on one or more pre-defined rules. In some cases, the device can either choose the assisted information in terms of, for example, number of repetition (or PRS subframes to accumulate), or decide it by its own.

At step 508, the UE performs at least one OTDOA measurement based on the determined at least one parameter. The present disclosure contemplates that the UE may perform any suitable measurement based on the maintained UE capability. For example, the UE may perform a RSTD measurement together.

In certain embodiments, the UE may send a result of the at least one OTDOA measurement to another node. The other node may be any suitable node (for example, a network node or another UE). The present disclosure contemplates that the UE may send the result of the at least one OTDOA measurement to another node in any suitable manner. For example, in certain embodiments the UE may send the RSTD measurement together with the choice of number of PRS subframes to a location server. In certain embodiments, the UE may use a result of the at least one OTDOA measurement for one or more operations related to positioning. The one or more operations related to positioning may be any suitable operations related to positioning. For example, in certain embodiments the one or more operations related to positioning may comprise calculating a UE location.

Figure 6:
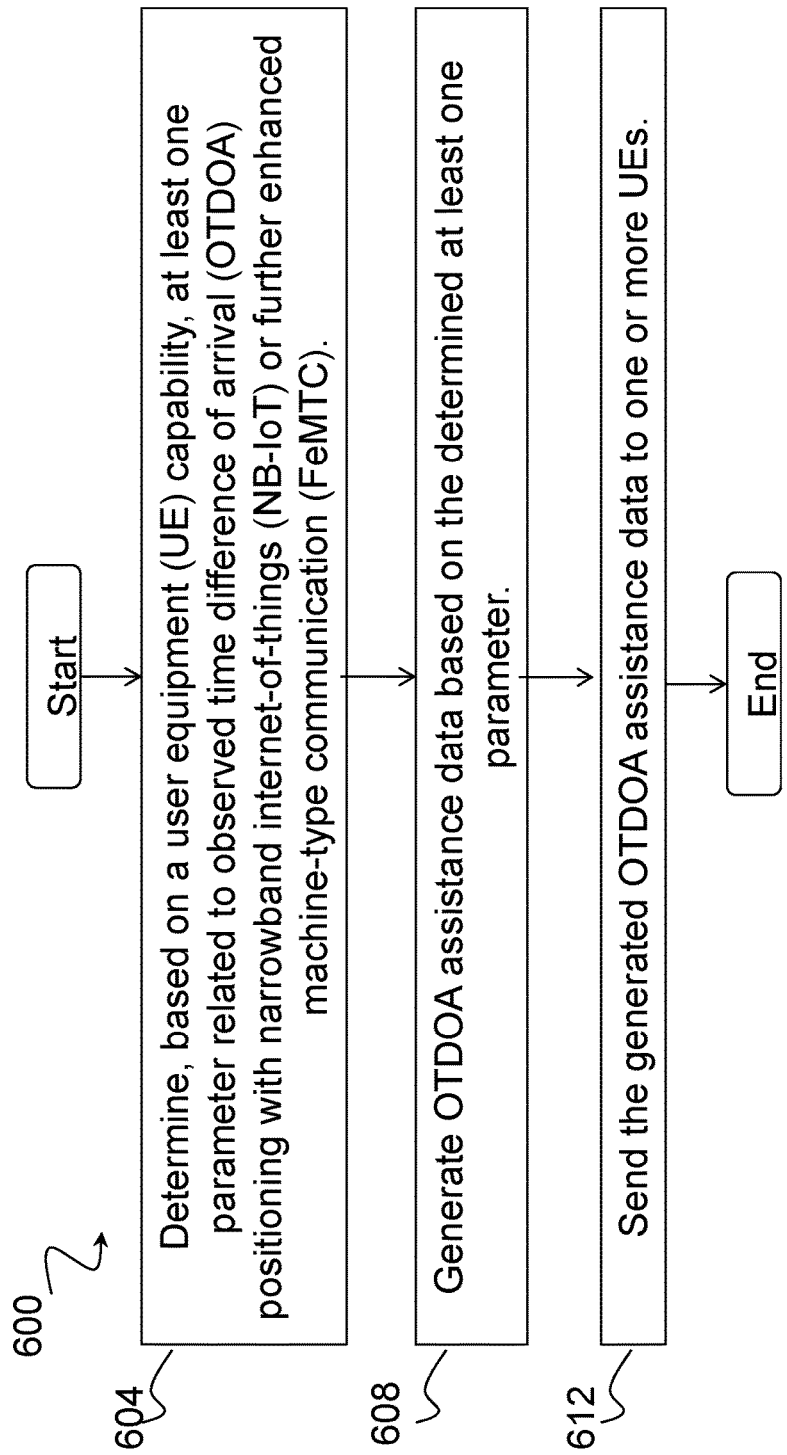
FIG. 6 is a flow diagram of a method in a network node, in accordance with certain embodiments.

FIG. 6 is a flow diagram of a method in a network node, in accordance with certain embodiments. The method begins at step 604, where the network node determines, based on a UE capability, at least one parameter related to OTDOA positioning with NB-IoT or FeMTC. In certain embodiments, the network node may receive the UE capability related to OTDOA positioning with NB-IoT or FeMTC (e.g., from the UE or another network node).

At step 608, the network node generates OTDOA assistance data based on the determined at least one parameter. The network node may generate the OTDOA assistance data in any suitable manner. At step 612, the network node sends the generated OTDOA assistance data to one or more UEs. The network node may send the generated OTDOA assistance data to one or more UEs in any suitable manner.

In certain embodiments, the network node may avoid unnecessary OTDOA signaling fields that do not benefit for example NB-IoT devices. In certain embodiments, the network node may receive from the UE a result of using the sent OTDOA assistance data and send it to another node or use it for a positioning purpose (e.g., calculate UE location). In certain embodiments, the result of using the sent OTDOA assistance data may be one or more measurement results. For example, in certain embodiments the network node may receive RSTD information and the choice of the device based on number of accumulated subframes from the device (e.g., UE).

Figure 7:
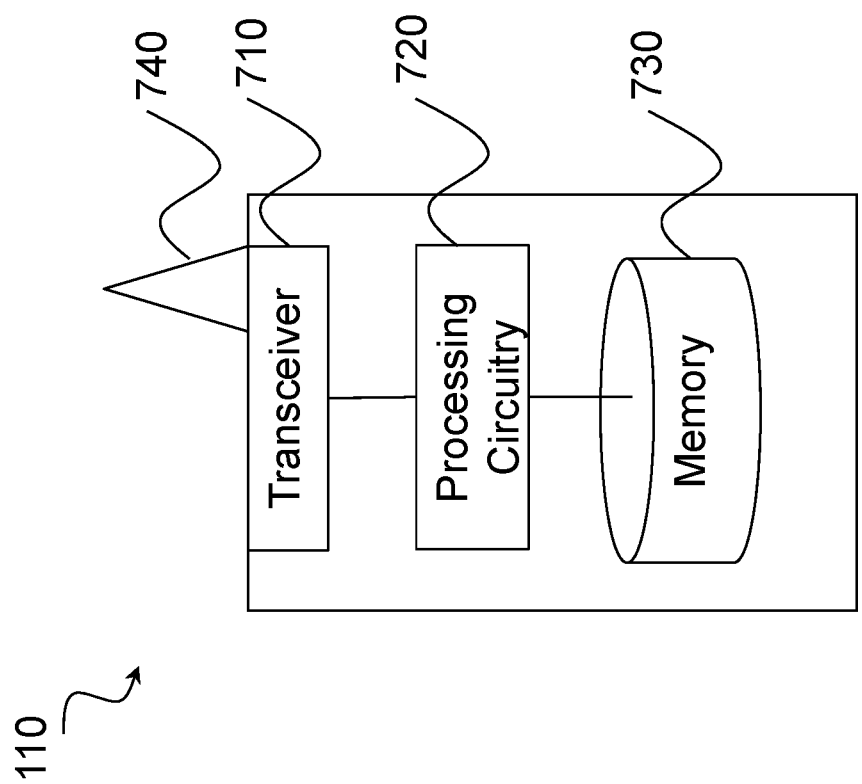
FIG. 7 is a block schematic of an exemplary wireless device, in accordance with certain embodiments.

FIG. 7 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, an MTC device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processing circuitry 720, and memory 730. In some embodiments, transceiver 710 facilitates transmitting wireless signals to and receiving wireless signals from network node 115 (e.g., via antenna 740), processing circuitry 720 (e.g., which may include one or more processors) executes instructions to provide some or all of the functionality described above as being provided by wireless device 110, and memory 730 stores the instructions executed by processing circuitry 720.

Processing circuitry 720 may include any suitable combination of hardware and software implemented in one or more modules to execute instructions and manipulate data to perform some or all of the described functions of wireless device 110, such as the functions of UE 110 (i.e., wireless device 110) described in relation to any of FIGS. 1-6 and/or 12-13. In some embodiments, processing circuitry 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 1020.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processing circuitry 720. Input devices include mechanisms for entry of data into wireless device 110. For example, input devices may include input mechanisms, such as a microphone, input elements, a display, etc. Output devices may include mechanisms for outputting data in audio, video, and/or hard copy format. For example, output devices may include a speaker, a display, etc.

Figure 8:
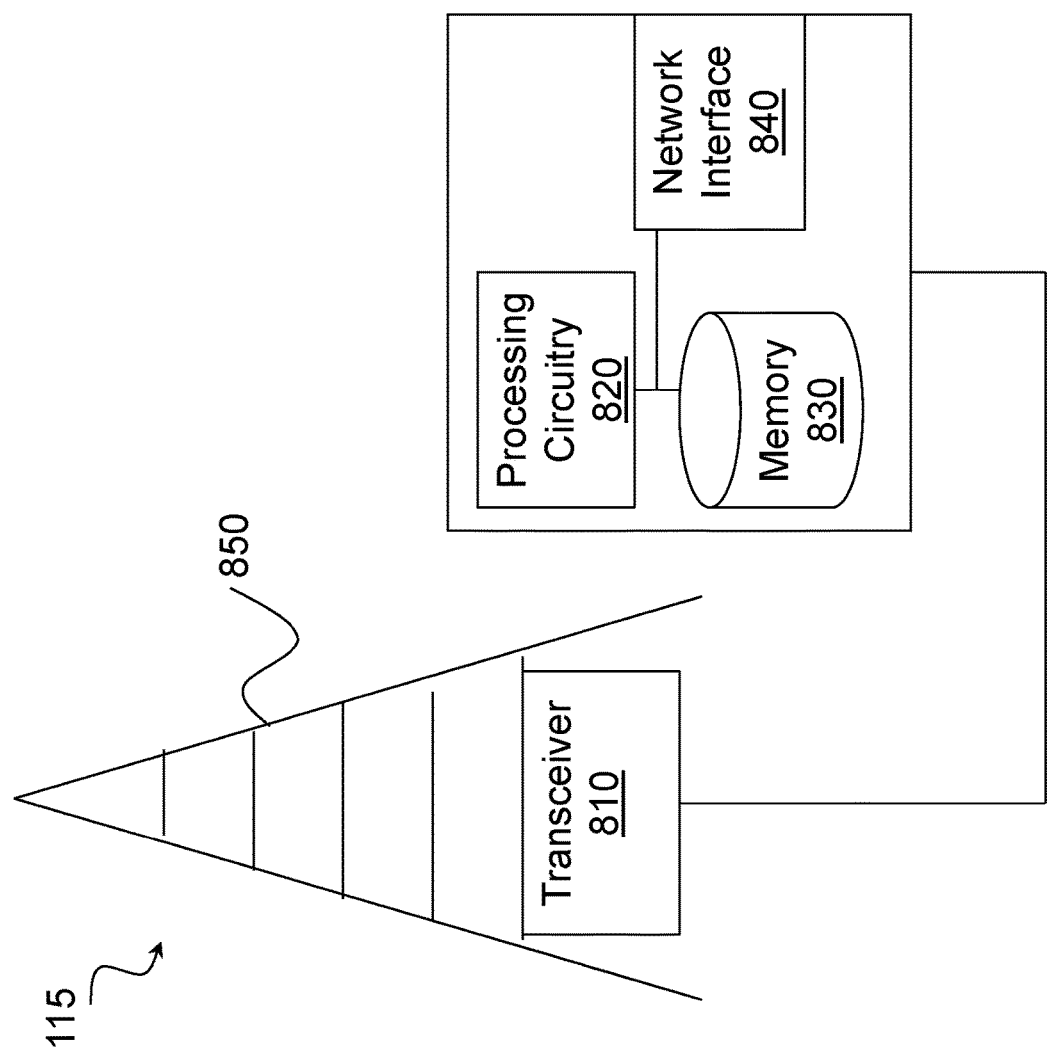
FIG. 8 is a block schematic of an exemplary network node, in accordance with certain embodiments.

FIG. 8 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processing circuitry 820 (e.g., which may include one or more processors), memory 830, and network interface 840. In some embodiments, transceiver 810 facilitates transmitting wireless signals to and receiving wireless signals from wireless device 110 (e.g., via antenna 850), processing circuitry 820 executes instructions to provide some or all of the functionality described above as being provided by a network node 115, memory 830 stores the instructions executed by processing circuitry 820, and network interface 840 communicates signals to backend network components, such as a gateway, switch, router, Internet, Public Switched Telephone Network (PSTN), core network nodes or radio network controllers 130, etc.

Processing circuitry 820 may include any suitable combination of hardware and software implemented in one or more modules to execute instructions and manipulate data to perform some or all of the described functions of network node 115, such as those described in relation to any of FIGS. 1-6 and/or 12-13. In some embodiments, processing circuitry 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processing circuitry 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
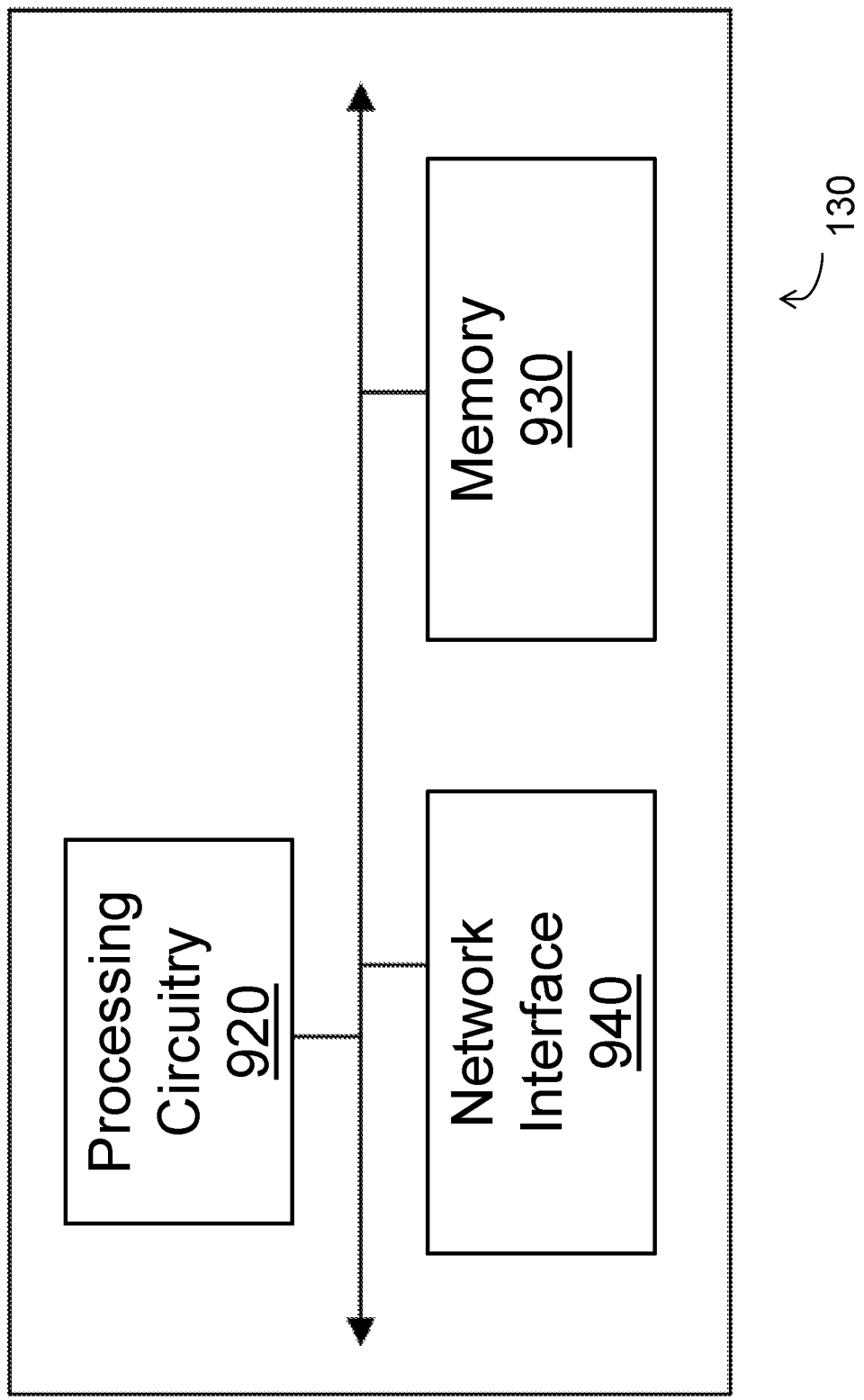
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processing circuitry 920

(e.g., which may include one or more processors), memory 930, and network interface 940. In some embodiments, processing circuitry 920 executes instructions to provide some or all of the functionality described above as being provided by the network node, memory 930 stores the instructions executed by processing circuitry 920, and network interface 940 communicates signals to any suitable node, such as a gateway, switch, router, Internet, Public Switched Telephone Network (PSTN), network nodes 115, radio network controllers or core network nodes 130, etc.

Processing circuitry 920 may include any suitable combination of hardware and software implemented in one or more modules to execute instructions and manipulate data to perform some or all of the described functions of the radio network controller or core network node 130. In some embodiments, processing circuitry 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processing circuitry 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
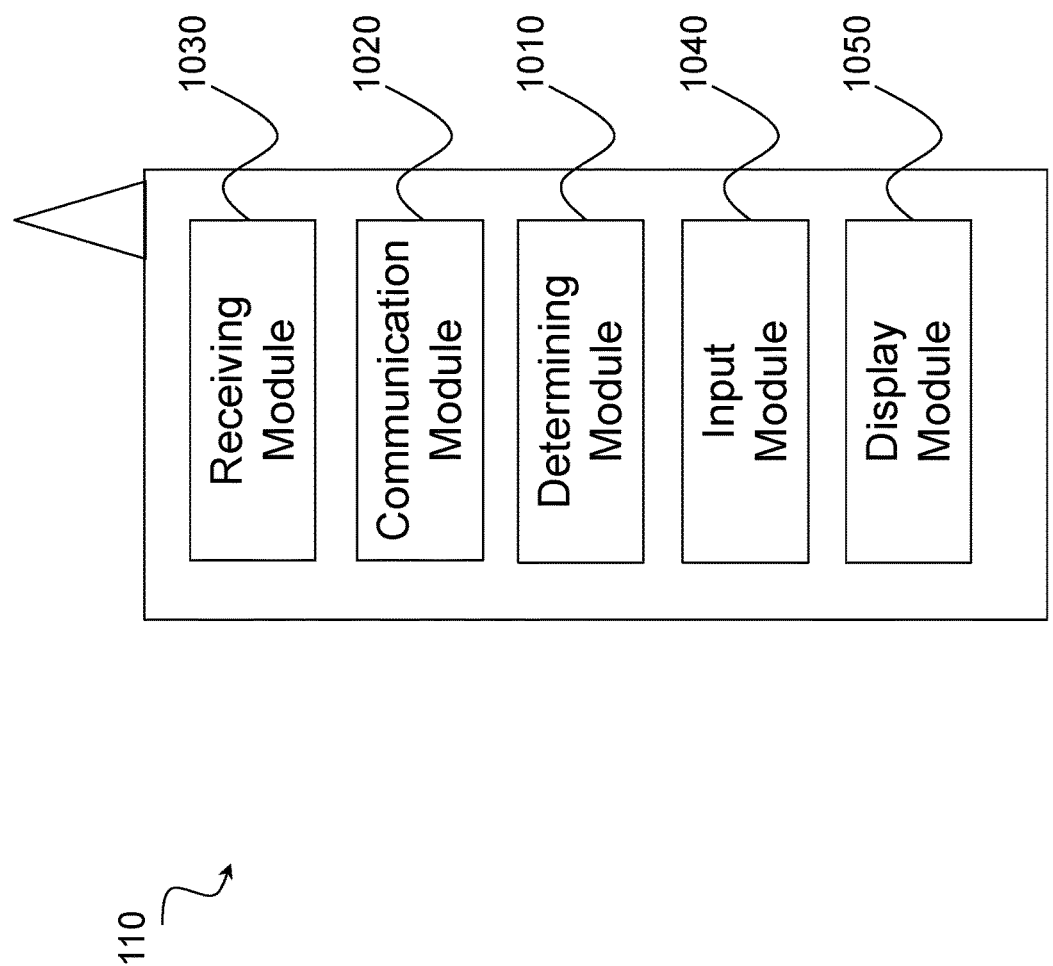
FIG. 10 is a block schematic of an exemplary wireless device, in accordance with certain embodiments.

FIG. 10 is a block schematic of an exemplary wireless device, in accordance with certain embodiments. Wireless device 110 may include one or more modules. For example, wireless device 110 may include a determining module 1010, a communication module 1020, a receiving module 1030, an input module 1040, a display module 1050, and any other suitable modules. Wireless device 110 may perform the methods related to OTDOA positioning with MTC or NB-IoT described with respect to any of FIGS. 1-6 and/or 12-13 as being performed by a wireless device or UE.

Determining module 1010 may perform the processing functions of wireless device 110. For example, determining module 1010 may determine (and use) at least one parameter related to positioning, the at least one parameter determined based on a capability of the wireless device 110 that relates to OTDOA positioning with NB-IoT or MTC. As another example, determining module 1010 may maintain a UE capability related to OTDOA positioning with NB-IoT or FeMTC (e.g., in one or more memory, such as memory 730 described above in relation to FIG. 7). As another example, determining module 1010 may determine, based on a UE capability related to OTDOA positioning with NB-IoT or FeMTC known or available to the UE, at least one parameter related to OTDOA positioning with NB-IoT or FeMTC. As still another example, determining module 1010 may determine the at least one parameter related to OTDOA positioning based on one or more pre-defined rules. As yet another example, determining module 1010 may perform at least one OTDOA measurement based on the determined at least one parameter. As another example, determining module 1010 may use a result of the at least one OTDOA measurement for one or more operations related to positioning. Determining module 1010 may include or be included in one or more processors, such as processing circuitry 720 described above in relation to FIG. 7. Determining module 1010 may include analog and/or digital circuitry configured to perform any of the functions of determining module 1010 and/or processing circuitry 720 described above. The functions of determining module 1010 described above may, in certain embodiments, be performed in one or more distinct modules.

Communication module 1020 may perform the transmission functions of wireless device 110. For example, communication module 1020 may signal the UE capability to the network (e.g., to a network node such as an eNB or E-SMLC). As another example, communication module 1020 may send a result of the at least one OTDOA measurement to another node (e.g., E-SMLC or eNB). Communication module 1020 may transmit messages to one or more of network nodes 115 of network 100. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010. In certain embodiments, the functions of communication module 1020 described above may be performed in one or more distinct modules.

Receiving module 1030 may perform the receiving functions of wireless device 110. As one example, receiving module 1030 may obtain the at least one parameter related to OTDOA positioning based on one or more of a message or an indication received from another node (e.g., OTDOA network assistance data received from a network node such as E-SMLC or eNB). Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

Figure 11:
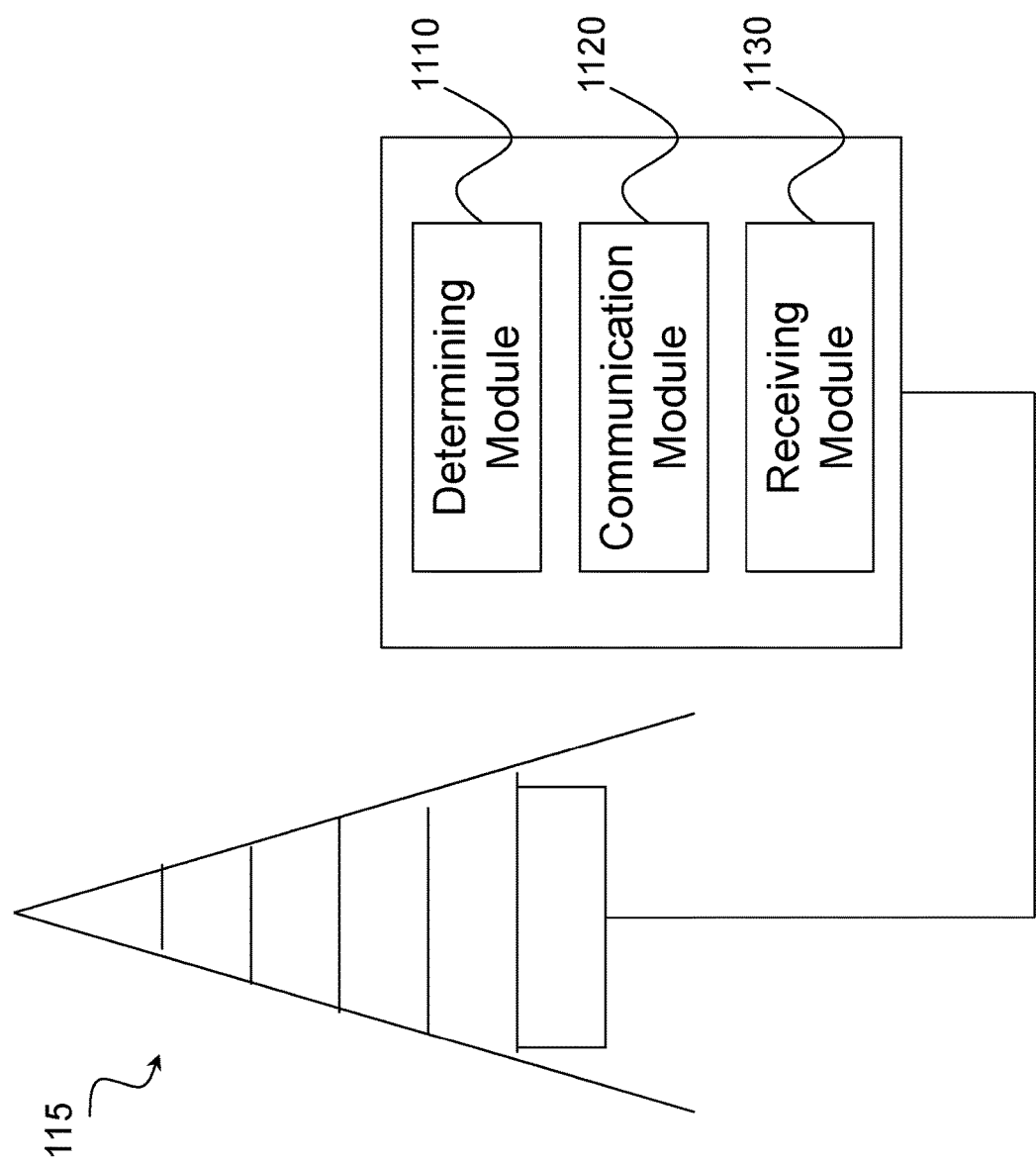
FIG. 11 is a block schematic of an exemplary network node, in accordance with certain embodiments.

FIG. 11 is a block schematic of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processing circuitry 820 described above in relation to FIG. 8. In certain embodiments, the functions of two or more of the various modules may be combined into a single module. Network node 115 may perform the methods related to providing assistance for OTDOA positioning with MTC or NB-IoT described with respect to any of FIGS. 1-6 and/or 12-13 as being performed by a network node (such as an eNB or an E-SMLC).

Determining module 1110 may perform the processing functions of network node 115. For example, determining module 1110 may determine, based on a UE equipment capability, at least one parameter related to OTDOA positioning with NB-IoT or FeMTC. As another example, determining module 1110 may generate OTDOA assistance data based on the determined at least one parameter. As another example, determining module 1110 may avoid unnecessary OTDOA signaling fields that do not benefit, for example, NB-IoT devices. As still another example, determining module 1110 may use a result of using the sent OTDOA assistance data from a UE for a positioning purpose (e.g., to calculate a location of the UE). Determining module 1110 may include or be included in one or more processors, such as processing circuitry 820 described above in relation to FIG. 8. Determining module 1110 may include analog and/or digital circuitry configured to perform any of the functions of determining module 1110 and/or processing circuitry 820 described above. The functions of determining module 1110 may, in certain embodiments, be performed in one or more distinct modules. For example, in certain embodiments some of the functionality of determining module 1110 may be performed by an allocation module.

Communication module 1120 may perform the transmission functions of network node 115. As one example, communication module 1120 may send the generated OTDOA assistance data to one or more UEs (e.g., via unicast, multicast, or broadcast signaling). As another example, communication module 1120 may send a result of using the sent OTDOA assistance data received from the UE to another node. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. For example, receiving module 1130 may receive a UE capability related to OTDOA positioning with NB-IoT or FeMTC. As another example, receiving module 1130 may receive from the UE a result of using the sent OTDOA assistance data. Receiving module 1130 may receive any suitable information from a wireless device. Receiving module 1130 may include a receiver and/or a transceiver, such as transceiver 810 described above in relation to FIG. 8. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Figure 12:
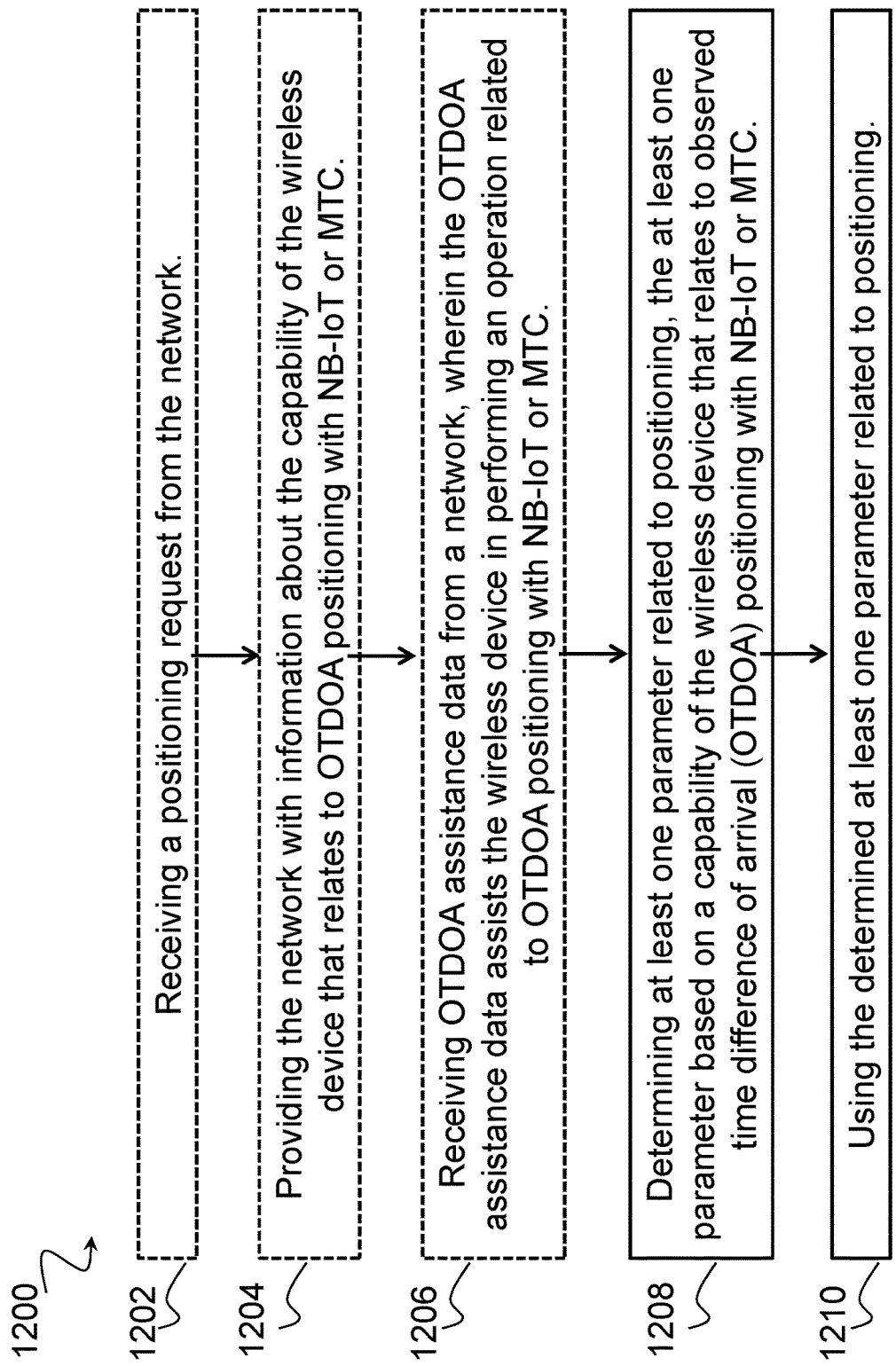
FIG. 12 is a flow diagram of a method in a user equipment, in accordance with certain embodiments.

FIG. 12 is a flow diagram for use in a wireless device 110 that is configured as a NB-IoT device or an MTC device. At step 1202, wireless device 110 receives a positioning request from the network. The positioning request may be received from a network node, such as an eNB or E-SMLC. In response to receiving the positioning request, wireless device 110 provides the network with information about the capability of wireless device 110 that relates to OTDOA positioning with NB-IoT or MTC. For example, the capability of the wireless device can be provided to a network node (e.g., eNB) via RRC signaling or a location server (e.g., E-SMLC) via LPP signaling. Examples of capability information that may be provided to the network include one or more of bandwidth, sampling rate, support for inter-frequency measurements, coverage class, support for positioning, number of receive antennas, UE category, protocol release supported by the wireless device, and/or battery status. Wireless device capabilities related to OTDOA positioning with NB-IoT or MTC are further discussed above, for example, in Section 1.1.

At step 1206, wireless device 110 receives OTDOA assistance data from the network. The OTDOA assistance data assists the wireless device in performing an operation related to OTDOA positioning with NB-IoT or MTC. The OTDOA assistance data can be received in any suitable message, such as broadcast message, multicast message, or unicast message. In certain embodiments, the OTDOA assistance data indicates a reference cell, a neighbor cell, and/or a frequency to be measured by the wireless device when performing an RSTD measurement. In certain embodiments, the OTDOA assistance data indicates a PRS configuration. In certain embodiments, the OTDOA assistance data comprises a PRS subframe offset.

At step 1208, wireless device 110 determines at least one parameter related to positioning. A parameter may be considered to be related to positioning if it relates to a property of the wireless device that relates to positioning. The at least one parameter is based on a capability of the wireless device that relates to OTDOA positioning with NB-IoT or MTC. In certain embodiments, the at least one parameter related to positioning is determined based on a pre-defined rule. In certain embodiments, the determined parameter related to positioning is received from the network. Thus, wireless device can determine to use a parameter received from the network or can determine a parameter based on information received from the network. In certain embodiments, the determined parameter may comprise a parameter received in (or derived from) the OTDOA assistance data received in step 1206. Examples of the determined parameter include a maximum response time that the wireless device is to use when performing an operation related to positioning and/or a minimum number of repetitions of a DL reference signal that the wireless device is to aggregate when performing an operation related to positioning. In certain embodiments, the minimum number of repetitions is determined from a set of values corresponding to different SINRs. Determining a parameter is also described above, for example, with respect to Section 1.2.

At step 1210, wireless device 110 uses the determined at least one parameter related to positioning. In certain embodiments, using the determined at least one parameter related to positioning comprises performing at least one OTDOA measurement based on the determined at least one parameter. In certain embodiments, using the determined at least one parameter related to positioning comprises sending a result of the at least one OTDOA measurement to another node (such as an eNB or E-SMLC). In certain embodiments, using the determined at least one parameter related to positioning comprises using a result of the at least one OTDOA measurement for one or more operations related to positioning, such as an operation of calculating a location of the wireless device (wherein the calculation is performed at the wireless device), or sending information to the network that assists the network in calculating the location of the wireless device.

One or more of the steps described with respect to FIG. 12 may be optional, depending on the embodiment. As an example, receiving a positioning request (step 1202) may be optional in some embodiments, such as when the wireless device 110 initiates a positioning operation itself or when the network does not need to prompt the wireless device to provide its capability information (e.g., because the network already knows the capabilities of the wireless device). As another example, step 1204 may be optional for embodiments in which the network generates OTDOA assistance data based on saved capabilities of the wireless device (e.g., the wireless device 110 does not necessarily have to provide the network with its capabilities for each positioning operation if the network already knows the capabilities of the wireless device 110). As another example, step 1206 may be optional for embodiments in which wireless device 110 determines the parameter(s) related to positioning based on pre-defined rules (without requiring network assistance).

Figure 13:
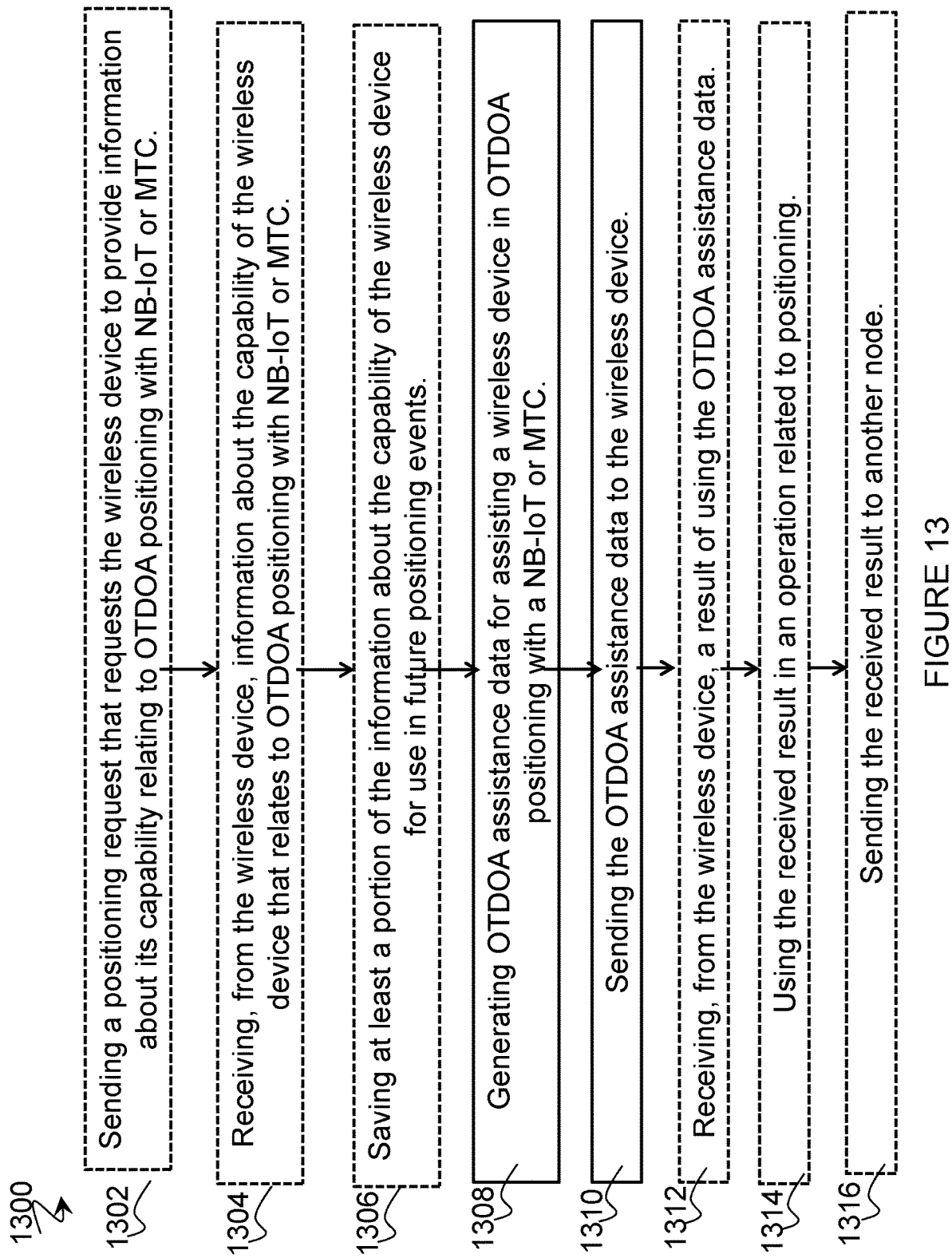
FIG. 13 is a flow diagram of a method in a network node, in accordance with certain embodiments.

FIG. 13 is a flow diagram of a method in a network node 115 (such as an eNB or E-SMLC), in accordance with certain embodiments. At step 1302, network node 115 sends a positioning request that requests the wireless device 110 to provide information about the capability of the wireless device that relates to OTDOA positioning with NB-IoT or MTC. As discussed above in Section 1.1, examples of capability information include one or more of bandwidth, sampling rate, support for inter-frequency measurements, coverage class, support for positioning, number of receive antennas, UE category, protocol release supported by the wireless device, and/or battery status. In certain embodiments, sending the positioning request may implicitly request the capability information. For example, wireless device 110 may be pre-configured to provide certain capability information in response to receiving a positioning request. In other embodiments, the positioning request may expressly indicate the type of capability information that network node 115 requests wireless device 110 to provide. For example, if network node 115 has previously saved capability information about wireless device 110, network node 115 may determine to request the wireless device to provide a subset of capabilities that may have changed (such as battery status).

In certain embodiments, step 1302 may be optional. For example, network node 115 does not necessarily need to request capability information of wireless device 110 if network node 115 already knows wireless device 110's capabilities or if network node 115 is able to readily obtain the wireless device 110's capabilities from the network. Network node 115 does not necessarily have to send the positioning request to trigger a positioning operation (e.g., in certain embodiments, wireless device 110 or another network node may trigger the positioning operation).

At step 1304, network node 115 receives, from the wireless device 110, information about the capability of the wireless device that relates to OTDOA positioning with NB-IoT or MTC. For example, wireless device 115 may provide the information in response to receiving the positioning request in step 1302. In certain embodiments, such as when network node 115 comprises an eNB, the information about the capability of the wireless device is received via RRC signaling. In certain embodiments, such as when network node 115 comprises an E-SMLC, the information about the capability of the wireless device is received via LPP signaling. In certain embodiments, step 1304 may be optional (such as in embodiments that omit step 1302).

At step 1306, network node 115 saves at least a portion of the information about the capability of the wireless device for use in future positioning events. For example, network node 115 may determine to save information that does not change (or that does not frequently change) and may determine not to save information that changes frequently (such as battery status). Step 1306 may be optional in certain embodiments (e.g., network node 115 may re-request capability information from wireless device during a future positioning event). However, step 1306 may allow for reducing signaling between network node 115 and wireless device 110 in some embodiments.

At step 1308, network node 115 generates OTDOA assistance data for assisting a wireless device 110 in OTDOA positioning with NB-IoT or MTC. In certain embodiments, the OTDOA assistance data is based on the capability of the wireless device. The capability information used to generate the OTDOA assistance data can include information that network node 115 received from wireless device 110 in step 1304 and/or information that the network had previously saved about the capability of the wireless device (such that the network node did not need to re-request the previously saved information in step 1302).

Examples of OTDOA assistance data include data indicating a reference cell, a neighbor cell, and/or a frequency to be measured by the wireless device when performing a an RSTD measurement. In certain embodiments, the OTDOA assistance data indicates a PRS configuration. In certain embodiments, the OTDOA assistance data comprises a PRS subframe offset. In certain embodiments, the OTDOA assistance information indicates a minimum number of repetitions of a DL reference signal that the wireless device is to aggregate when performing an operation related to positioning. In certain embodiments, the OTDOA assistance data comprises a set of values from which the wireless device selects the minimum number of repetitions based on SINRs. In certain embodiments, the OTDOA assistance data indicates a maximum response time that the wireless device is to use when performing an operation related to positioning.

In certain embodiments, generating the OTDOA assistance data comprises determining fields to add or remove to the OTDOA assistance data based on the capabilities of the wireless device. For example, as discussed above in Section 1.4, network node 115 can determine fields to remove in order to avoid unnecessary OTDOA signaling fields that, based on the capabilities of the wireless device, do not benefit the wireless device.

At step 1310, network node 115 sends the OTDOA assistance data to the wireless device 110. The OTDOA assistance data can be sent in a broadcast message, multicast message, and/or unicast message.

At step 1312, network node 115 receives, from the wireless device, a result of using the OTDOA assistance data. For example, in certain embodiments, network node 115 may receive an OTDOA measurement from the wireless device. As another example, in certain embodiments, network node 115 may receive a position that the wireless device calculated using the OTDOA assistance data. In certain embodiments, the OTDOA assistance data sent in step 1310 comprises an amount of required repetitions, and network node 115 is further able to predict a positioning response time for receiving the result of step 1312 based on the amount of required repetitions. Step 1312 may be optional in some embodiments. For example, in certain embodiments, wireless device 110 may send the result of using the OTDOA assistance data to another node. As one example, in certain embodiments, an eNB may send OTDOA assistance data to the wireless device, and an E-SMLC may receive a result of using the OTDOA assistance data from the wireless device, or vice versa.

At step 1314, network node 115 uses the received result in an operation related to positioning. Using the received result may comprise calculating a location of the wireless device or sending the received result to another node (such as a node configured to calculate the location of the wireless device) (e.g., step 1316). In some embodiments, step 1314 may be optional (such as in embodiments that omit step 1312).

Summary of Example Embodiments

According to one example embodiment, a method in a user equipment is disclosed. The method comprises determining, based on a UE capability related to OTDOA positioning with NB-IoT or FeMTC known or available to the UE, at least one parameter related to OTDOA positioning with NB-IoT or FeMTC. The method comprises performing at least one OTDOA measurement based on the determined at least one parameter. In certain embodiments, one or more of the following may apply:
  the method may comprise maintaining a UE capability related to OTDOA positioning with NB-IoT or FeMTC;
    the UE capability related to OTDOA positioning with NB-IoT or FeMTC may comprise a parameter, which is known or available to the UE, representing or indicating a capability related to OTDOA positioning with NB-IoT or FeMTC;
  the method may comprise signaling the UE capability to the network (e.g., network node such as an eNB or E-SMLC);
  the method may comprise sending a result of the at least one OTDOA measurement to another node;
  the method may comprise using a result of the at least one OTDOA measurement for one or more operations related to positioning;
  determining, based on the maintained UE capability, at least one parameter related to OTDOA positioning with NB-IoT or FeMTC may comprise obtaining the at least one parameter related to OTDOA positioning based on one or more of a message or an indication received from another node
    the one or more of the message or the indication received from another node may comprise OTDOA network assistance data received from a network node such as an E-SMLC or an eNB;
  determining, based on the maintained UE capability, at least one parameter related to OTDOA positioning with NB-IoT or FeMTC may comprise determining the at least one parameter related to OTDOA positioning based on one or more pre-defined rules;
  the positioning purpose may comprise calculating a location of the UE;
  maintaining the UE capability related to OTDOA positioning with NB-IoT or FeMTC may comprise storing the UE capability in memory; and
  the determined at least one parameter related to OTDOA positioning with NB-IoT or FeMTC may comprise a number of necessary repetitions for aggregating a DL reference signal.

According to another example embodiment, a user equipment is disclosed. The user equipment comprises one or more processors. The one or more processors are configured to determine, based on a UE capability related to OTDOA positioning with NB-IoT or FeMTC known or available to the UE, at least one parameter related to OTDOA positioning with NB-IoT or FeMTC. The one or more processors are configured to perform at least one OTDOA measurement based on the determined at least one parameter.

According to another example embodiment, a method in a network node is disclosed. The method comprises determining, based on a UE capability, at least one parameter related to OTDOA positioning with NB-IoT or FeMTC. The method comprises generating OTDOA assistance data based on the determined at least one parameter. The method comprises sending the generated OTDOA assistance data to one or more UEs. In certain embodiments, one or more of the following may apply:
  the method may comprise receiving a UE capability related to OTDOA positioning with NB-IoT or FeMTC;
  the method may comprise avoiding unnecessary OTDOA signaling fields that do not benefit, for example, NB-IoT devices;
  the method may comprise receiving, from the UE, a result of using the sent OTDOA assistance data;
  the method may comprise sending the received result of using the sent OTDOA assistance data to another node;
  the method may comprise using the received result of using the sent OTDOA assistance data for a positioning purpose;
    using the received result may comprise calculating a location of the UE; and
  the determined at least one parameter related to OTDOA positioning with NB-IoT or FeMTC may comprise a number of necessary repetitions for aggregating a DL reference signal.

According to another example embodiment, a network node is disclosed. The network node comprises one or more processors. The one or more processors are configured to determine, based on a UE capability, at least one parameter related to OTDOA positioning with NB-IoT or FeMTC. The one or more processors are configured to generate OTDOA assistance data based on the determined at least one parameter. The one or more processors are configured to send the generated OTDOA assistance data to one or more UEs.

Certain embodiments of the present disclosure may provide one or more technical advantages. For example, certain embodiments may advantageously tailor the network OTDOA assistance data for FeMTC and NB-IoT UEs by both adding and removing fields in accordance to the device needs. As another example, certain embodiments may advantageously assist the UEs to properly select the number of repetitions they require to perform a proper positioning estimation. As still another example, certain embodiments may advantageously minimize the complexity and power consumption at the UE side. As yet another example, certain embodiments may advantageously enable the network to predict the positioning response time based on the amount of required repetitions from the NB-IoT UE. Other advantages may be readily apparent to one having skill in the art. Certain embodiments may have none, some, or all of the recited advantages.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method for use in a wireless device that is configured as a Narrowband Internet-of-Things (NB-IoT) device or a machine-type-communication (MTC) device, the method comprising:
   determining at least one parameter related to positioning, the at least one parameter based on a capability of the wireless device that relates to observed time difference of arrival (OTDOA) positioning with NB-IoT or MTC, wherein the determined at least one parameter comprises a minimum number of repetitions of a downlink (DL) reference signal that the wireless device is to aggregate when performing an operation related to positioning; and
   using the determined at least one parameter related to positioning.

2. The method of claim 1, further comprising:
   receiving OTDOA assistance data from a network, wherein the OTDOA assistance data assists the wireless device in performing an operation related to OTDOA positioning with NB-IoT or MTC.

3. The method of claim 2, wherein the OTDOA assistance data is received in a broadcast message or a multicast message.

4. The method of claim 2, wherein the OTDOA assistance data is received in a unicast message.

5. The method of claim 2, wherein the OTDOA assistance data indicates a reference cell, a neighbor cell, and/or a frequency to be measured by the wireless device when performing a reference signal time difference (RSTD) measurement.

6. The method of claim 2, wherein the OTDOA assistance data indicates a positioning reference signal (PRS) configuration.

7. The method of claim 2, wherein the OTDOA assistance data comprises a PRS subframe offset.

8. The method of claim 1, wherein the capability of the wireless device that relates to OTDOA positioning with NB-IoT or MTC comprises at least one of: bandwidth, sampling rate, support for inter-frequency measurements, coverage class, support for positioning, number of receive antennas, user equipment (UE) category, and/or a protocol release supported by the wireless device.

9. A method for use in a network node, the method comprising:
   generating observed time difference of arrival (OTDOA) assistance data for assisting a wireless device in OTDOA positioning with Narrowband Internet-of-Things (NB-IoT) or machine-type-communication (MTC), wherein:
      the OTDOA assistance data is based on the capability of the wireless devices; and
      the OTDOA assistance data indicates a minimum number of repetitions of a downlink (DL) reference signal that the wireless device is to aggregate when performing an operation related to positioning; and
   sending the OTDOA assistance data to the wireless device.

10. The method of claim 9, wherein the OTDOA assistance data is sent in a broadcast message or a multicast message.

11. The method of claim 9, wherein the OTDOA assistance data is sent in a unicast message.

12. The method of claim 9, wherein the OTDOA assistance data indicates a reference cell, a neighbor cell, and/or a frequency to be measured by the wireless device when performing a reference signal time difference (RSTD) measurement.

13. The method of claim 9, wherein the OTDOA assistance data indicates a positioning reference signal (PRS) configuration.

14. The method of claim 9, wherein the OTDOA assistance data comprises a PRS subframe offset.

15. The method of claim 9, further comprising sending a positioning request that requests the wireless device to provide information about the capability of the wireless device that relates to OTDOA positioning with NB-IoT or MTC.

16. The method of claim 9, further comprising:
   receiving, from the wireless device, information about the capability of the wireless device that relates to OTDOA positioning with NB-IoT or MTC.

17. A wireless device configured as a Narrowband Internet-of-Things (NB-IoT) device or a machine-type-communication (MTC) device, the wireless device comprising memory operable to store instructions and processing circuitry operable to execute the instructions, whereby the wireless device is operable to:
- determine at least one parameter related to positioning, the at least one parameter based on a capability of the wireless device that relates to observed time difference of arrival (OTDOA) positioning with NB-IoT or MTC, wherein the determined at least one parameter comprises a minimum number of repetitions of a downlink (DL) reference signal that the wireless device is to aggregate when performing an operation related to positioning; and
- use the determined at least one parameter related to positioning.

18. A network node comprising memory operable to store instructions and processing circuitry operable to execute the instructions, whereby the network node is operable to:
- generate observed time difference of arrival (OTDOA) assistance data for assisting a wireless device in OTDOA positioning with Narrowband Internet-of-Things (NB-IoT) or machine-type-communication (MTC), wherein:
  - the OTDOA assistance data is based on the capability of the wireless devices and
  - the OTDOA assistance data indicates a minimum number of repetitions of a downlink (DL) reference signal that the wireless device is to aggregate when performing an operation related to positioning; and
- send the OTDOA assistance data to the wireless device.

* * * * *